(12) United States Patent
Stoddard et al.

(10) Patent No.: US 6,804,580 B1
(45) Date of Patent: Oct. 12, 2004

(54) METHOD AND CONTROL SYSTEM FOR CONTROLLING A PLURALITY OF ROBOTS

(75) Inventors: Kenneth A. Stoddard, Rochester, MI (US); R. William Kneifel, II, Rochester Hills, MI (US); David M. Martin, Oakland Township, MI (US); Khalid Mirza, Rochester Hills, MI (US); Michael C. Chaffee, Portland, MI (US); Andreas Hagenauer, Friedberg (DE); Stefan Graf, Zusamaltheim (DE)

(73) Assignee: Kuka Roboter GmbH, Augsburg (DE)

( * ) Notice: Subject to any disclaimer, the term of this patent is extended or adjusted under 35 U.S.C. 154(b) by 0 days.

(21) Appl. No.: 10/406,521

(22) Filed: Apr. 3, 2003

(51) Int. Cl.$^7$ ............................................. G05B 19/418
(52) U.S. Cl. ...................... 700/248; 700/245; 700/246; 700/247; 700/249; 700/250; 700/251; 700/254; 700/256; 700/264; 318/568.1; 318/568.11; 318/568.13; 318/568.16; 318/573; 318/574; 701/23; 701/28; 701/47; 701/200; 701/213; 701/217; 701/220; 901/6; 901/9; 901/46; 901/47; 901/48; 714/15; 714/23; 714/24; 74/490.01
(58) Field of Search ................................. 700/245–251, 700/254, 256, 264; 701/23, 228, 47, 200, 213, 217, 220, 28; 318/568.1, 568.11, 568.13, 568.16, 573, 574; 901/6, 9, 46, 48, 47; 801/47; 74/490.01; 714/15, 23, 24

(56) References Cited

U.S. PATENT DOCUMENTS

| | | | | | |
|---|---|---|---|---|---|
| 5,125,298 | A | * | 6/1992 | Smith ......................... | 81/57.37 |
| 6,330,493 | B1 | * | 12/2001 | Takahashi et al. .......... | 700/245 |
| 6,442,451 | B1 | * | 8/2002 | Lapham ...................... | 700/245 |
| 6,466,844 | B1 | * | 10/2002 | Ikeda et al. ................. | 700/245 |
| 6,496,755 | B2 | * | 12/2002 | Wallach et al. ............. | 700/245 |
| 6,516,248 | B2 | * | 2/2003 | McGee et al. .............. | 700/254 |
| 6,519,507 | B1 | * | 2/2003 | Noguchi et al. ............ | 700/264 |
| 6,522,949 | B1 | * | 2/2003 | Ikeda et al. ................. | 700/245 |
| 6,529,802 | B1 | * | 3/2003 | Kawakita et al. ........... | 700/245 |
| 6,556,891 | B2 | * | 4/2003 | Hietmann et al. .......... | 700/245 |
| 6,560,511 | B1 | * | 5/2003 | Yokoo et al. ............... | 700/245 |
| 6,587,749 | B2 | * | 7/2003 | Matsumoto ................. | 700/245 |
| 6,675,070 | B2 | * | 1/2004 | Lapham ...................... | 700/245 |

* cited by examiner

Primary Examiner—Thomas G. Black
Assistant Examiner—McDieunel Marc
(74) Attorney, Agent, or Firm—McGlew and Tuttle, P.C.

(57) ABSTRACT

A system for controlling a plurality of robots and a method for controlling said system. Said system comprises a plurality of controllers, each having an associated motion system adapted to control attached robots, with each motion controller being able to receive motion instructions from at least one motion instruction source and at least one of said motion instruction sources being a control program, as well as a computer network over which said controllers communicate. In this way, the invention can be applied to solve problems which are commonly encountered in coordination activities such as load sharing, mating of parts while processing, fixtureless transfer, teaching, manual motion of coordinated operations, and time coordinated motion.

32 Claims, 13 Drawing Sheets

METHOD AND CONTROL SYSTEM FOR CONTROLLING A PLURALITY OF ROBOTS

BACKGROUND

The present invention relates to a system for controlling a plurality of robots and a method for controlling a system of a plurality of robots, the system comprising a plurality of robot controllers, each with an associated motion system adapted to control attached robots, with each controller being able to receive motion instructions from at least one motion instruction source the controllers being connected with each other by a computer communication network.

By using a single controller for multiple robot coordination the "locality of coordinated control" is limited to the number of robots controllable by that controller. For example, a typical coordination problem with multiple robots is to transfer a part between robots without using intermediate fixtures. A controller capable of controlling only four robots would permit coordinated handoff of parts between the four robots, but would require a conventional fixture station or other solution when handing the part to a fifth robot controlled by a separate controller. On the other hand, a plurality of robots each having its own controller, with all controllers connected by a communication line, does not have this locality limitation.

The U.S. Pat. No. 6,330,493 B1 shows a control system applied to several robot controllers connected by a communication line. This solution solves the specific problem of limitation of robots being able to be coordinated by one controller, but it solves this problem only with marginal precision, and leaves other coordination problems unsolved.

Such coordination problems of several robots include:

Load sharing—The ability for two or more robotic machines to carry the same part or load requires the robots to keep a fixed spatial relationship while carrying the load. This particular coordination problem is also solved in the prior art, but is introduced here as background to the other coordination problems.

Parts mating while processing—In addition to the requirement for a fixed spatial relationship among two or more robots, one or more additional robots must perform a process relative to the assembly, and one or more robots may enter and leave the assembly during processing (cf. further explanation below).

Fixtureless transfer—One or more robots may need to rendezvous with one or more other robots while all of them are in continuous motion.

Manual motion of coordinated operations—When a production line is stopped because of an error, with two or more robots carrying the same part or holding multiple mating parts, it may be necessary to manually move the multiple robots in coordination to prevent breaking or dropping the part.

Teaching of coordinated operations—In activities where a fixed spatial relationship is maintained, such as part mating or load sharing, it is useful if the various robots need to be taught only one or a few grasping positions relative to the parts. Each robot should not have to be taught the entire part path, and if the part path is changed, only one of the robots should have to be re-taught to effect the path change.

Time coordinated motion—Multiple robots may need to carry out identical or mirrored processes in lock step timing with each other. There is no spatial relationship among the robots, but time alignment of their motions may be required.

The most complex of the above problems is simultaneous parts mating while processing. An example is the process of joining two small parts to a large part by arc welding using three robots without stationary fixtures: Robot 1 carries the large part. Robot 2 carries the two small parts, one at a time, and Robot 3 carries the arc-welding torch and performs the welding process. Such a process normally requires the large part to move simultaneously and time coordinated with the welding robot so that the welding robot can reach the entire part and the molten seams maintain a nearly horizontal orientation. This in turn requires spatial coordination of the motions of Robots 1, 2 and 3. Robot 2 must maintain a fixed position relative to Robot 1, so that the small part remains properly mated with the large part, and Robot 3 must carry out its welding process relative to the moving parts held by Robots 1 and 2.

As the weld proceeds, it is possible for Robot 2 to release its grasp of the small part, because the part has been tacked into position. Robot 2 can leave the assembly while the assembly motion is in progress and go fetch the second small part. Robot 2 returns with the second small part to rendezvous with the assembly. Robot 3 welds the second small part to the large part, again while all three robots move with spatial coordination.

The interesting features of said process besides the changing spatial relationships of the three robots are the following:

1. Robot 2 both leaves and joins the assembly while the latter may be in motion and changes from spatially coordinated motion to independent motion, or vice-versa, while the assembly may be in motion.
2. Typically, a portion of the welded seams are defined with respect to the small parts. For those portions, the arc welding robot is moving relative to the small parts, which at the same time must maintain a fixed position with respect to the large part. This is referred to as a "chain of spatial dependencies".

In the aforementioned U.S. Pat. No. 6,330,493 B1 a "synchronous cooperative operation" is defined. This operation occurs between a master and one or more slave robots. The definition of which robot is master and which are slaves is kept in software-based "link patterns". Link patterns change only between program sets. Thus, to change a given robot from coordinated operation with another robot to independent operation requires starting a new program in a sequence, and continuous motion between programs is not provided for. Thus, it is not possible to have a robot change from slave to independent operation and back to slave again all while the master remains in motion, as required in point 1 above. More generally, rendezvous and departure of one robot with another in motion is not possible with a single "synchronous cooperative operation" as defined in U.S. Pat. No. 6,330,493 or even multiple such operations.

Fixtureless transfer of parts also requires a rendezvous capability and a change from coordinated to independent operation as described above. The prior art is also not suitable for such coordination activity, except where all robots are controlled by a single controller, which in turn limits the locality of coordinated control.

As noted above, in the related art the designation of Master and slave robots is kept in link patterns, which can only be changed by changing programs. Thus, it is not possible for a robot to be both a master and a slave in the same program, and it is not possible for a robot to be both master and slave simultaneously. Thus, there is no way to implement the "chain of spatial dependencies" required by point 2 above using the related art.

An example of coordination activities listed above is load sharing. Once the coordinated activity begins, there is no relative motion between the grippers of the various robots carrying the part, so any method that can provide for a fixed spatial relationship during programmed motion may successfully carry out this activity with some level of precision. However, if production operation is stopped in the middle of such an activity, and it is required that the shared or mated assembly be moved out of the way, it must be possible to have a manual motion capability to move the shared assembly.

Using load sharing as a simple example, one can examine the activity of teaching a coordinated operation. Assume a heavy part that requires three or more robots to carry the part. One possibility is to provide a lightweight mockup, so that teaching can be carried out with one robot at a time. One would like to teach the path of this part in a conventional way, e.g. by simply using the standard manual motion and teaching system of the first robot to guide the robot carrying the part along the required path, recording required path positions and control program instructions along the way. Such a technique is provided for in most industrial robot systems today.

A first step in this technique is to determine a reference frame on the part that can be used as a basis for jogging the part held by the robot. With most industrial robots manufactured today, it is possible to teach a reference frame, known as the Tool Center Point (TCP) at a fixed position relative to the tooling mounting plate of the robot. In this case, the common reference frame on the part becomes the TCP for the first robot. The taught path of the part using the first robot is actually the path of that part reference frame. By teaching a TCP for the first robot, and two grasp points for the other two robots relative to the common part reference frame (TCP), the three robots can remain locked together both during manual motion and during playback of the desired part path.

Once the program and its associated taught positions and other data are prepared, the remaining two robots must be instructed on how to share the load. Ideally, this should be done by simply teaching a grasp point for each of the two remaining robots at two points on the part. It is desirable to do this by teaching these grasp positions relative to the common reference frame on the part, i.e. the TCP of the first robot. In this way, regardless of the path of the part carried by the first robot, if the other two robots know the position on the reference frame, they need only to move to their respective grasp positions relative to that reference frame to grasp the part, and remain at their respective grasp positions relative to the reference frame to carry the part.

The technique is particularly useful during the tedious teaching process, when the taught path of the part can change often. Once the actual heavy part replaces the lightweight substitute part, it is critical that the two "helper" robots keep their relative grasp position during any final touch-up, re-teaching or manual motion of the path carried out by the first robot.

The two primary requirements of the above technique are the ability for coordinated manual motion and the ability to teach positions for one robot relative to reference frames defined on another robot. Neither of these capabilities are provided in the prior art, except where the robots involved are controlled by a common controller.

Time coordinated motion between two or more robots is a useful form of coordination where the robots do not have a direct spatial relationship, but must run identical motions in separate programs in lock step. For example, when each of two robots follows an identical or mirrored path on a common part or two parts and the parts are mounted on a movable table, then the two robots must remain together during execution, so that they keep the same relative position to the moving table. This is quite common in the automotive industry where left- and right-handed versions of a part are to be assembled and welded simultaneously. It is common that the parts are large and must be carried on a single large table positioner to rotate them while the two robots weld the separate left- and right-handed parts. If the two robot control programs do not run in lock step, then it is possible that the table would move the part out of reach of one robot, while the other is properly welding, or that a molten seam on one part would deviate from its intended run on that part while the other is correctly welded. Solving this problem by starting and stopping one robot to keep in step with the other is not possible in arc welding or other processes where the seam must be welded continuously.

The above problem can be generalized to more than two robots in cases where many parts are carried on a common movable table or rotating axis, such that there is one processing robot for each part, and all robots must be coordinated in time to match relative position to the common table or axis. In this general form, each robot must maintain a spatial relationship with the table (but not necessarily with the other robots), and the motions generated by the robot control programs must remain coordinated in time with each other.

Coordination in time of the motion of two or more robots means that the motions must begin and end together, and in general follow the same relative acceleration and speed profile on each robot. Since the motion distances might be slightly different for each robot, this is not a straight forward task, and the ability to synchronize motion in this way between robots controlled by separate controllers has not been implemented in the prior art.

Another important issue common to all of the above types of coordinated motion is accuracy. When two or more robots carry multiple mating parts, or a common part, it is undesirable to have any relative motion between the robots, as this could cause stress in the part or misalignment of the mating parts. In the prior art, independent controllers, connected only by a communication line, may have misalignment between their internal clocks, and the output of their respective motion systems to their respective servo systems may not occur at exactly the same time. Such an error in registration at update times can cause stress or misalignment. For example, if the interpolation interval of the controllers is 16 milliseconds, and the interpolation clocks of two controllers are misaligned by nearly a full clock cycle, then an output from each interpolator will be used by the respective servo systems as much as 16 milliseconds apart. At a speed of 1 meter per second this induces 16 millimeters of misalignment between the robotic machines. An error of this magnitude is not tolerable in applications such as those found in the automotive industry, for example, where robot accuracies near 1 millimeter are expected.

In the U.S. Pat. No. 6,330,493 B1, where multiple robots are controlled by different controllers; applications are limited to low speed or applications where misregistration between coordinating robotic machines is permitted.

Several methods and standards exist for aligning clocks between systems. Some methods provide for computer clock alignment using standard communication lines such as Ethernet For example, the new IEEE 1588 standard provides this capability. Various publications, such as Horst F. Wedde and Wolfgang Freund, Harmonious internal clock synchronization, in EUROMICRO Workshop on Real-Time-Systems 2000 (ERST'00), IEEE Computer Society Press, p. 175–182, also suggest similar methods. However, the problem in a typical robot controller is that there are several clocks which all must be aligned for motion registration between two or more controllers. For example, a hardware clock is typically used in servo loop hardware to control the closure rate of digital servo loops. There may also exist a subinterpolator that runs at a multiple of the servo loop clock interval and an interpolator that runs at another multiple of the subinterpolator interval. These intervals usually must remain fixed and precise.

The published algorithms and methods, such as IEEE 1588, discuss how to align the execution of computer tasks or algorithms among systems connected by a communication line, but this does nothing to align the actual hardware clocks of the individual systems connected by the communication line. So for example, interpolators might be aligned with each other by these methods, but subinterpolators might be based on the individual hardware clocks, and these would not be aligned. In addition to the methods suggested by the published standards and algorithms, additional methods are needed to align ALL clocks including hardware clocks In summary, following is a list of requirements for coordinated activities between robots controlled by separate controllers that are not solved in the prior art and therefore form an objective for the present invention:

rendezvous and departure of one robot onto a part or assembly held by one or more other robots in order to support mating parts with assemblies and to support fixtureless transfer of parts between robots;

manual motion of parts or assemblies held by multiple robots in order to support maintenance and teaching;

teaching positions for one robot relative to a reference frame on another robot in order to make coordinated applications easier to teach and more reliable;

time coordination of similar motions on different robots in order to permit them to follow auxiliary axes simultaneously and to support repeatable process relative motions; and clock alignment among robot controllers in order to make motion registration between robots accurate.

It should be understood that all the above features in the prior art only exist on single commercially available robot controllers capable of controlling multiple robots from the single controller. When individual controllers are used for each robot, and the controllers communicate by a standard communication line such as Ethernet, these features do not exist.

There is a need for a multiple controller solution for industrial users, because cells of robots are becoming larger, and, therefore, the required "locality of control" is becoming larger than practical for a single controller. For example, to support one or more of the above listed coordinated activities in a cell with eight robots requires a controller capable of controlling over 48 axes, which is not commonly available and not practical. With the present invention, such a controller is not needed.

Accordingly, the general object of the invention is to provide a method and a robot control system for controlling multiple robots where various forms of coordinated motion are required among the robots and the controllers for those machines are connected via a standard computer communication line.

SUMMARY OF THE INVENTION

The invention solves the aforementioned motion coordination problems among the robots by providing a method of the above-mentioned kind wherein time coordinated motion instructions are defined and executed by said control program, each such time coordinated motion instruction with unique label, such that information is communicated among said plurality of controllers and wherein robot motion produced by like labeled time coordinated motion instructions executed on any of said plurality of controllers executes in such a way that they jointly begin at a first time, follow a common relative velocity profile, and jointly end at a second time.

To solve the aforementioned problems, the invention furtheron provides a system of the above-mentioned kind wherein said control program is arranged for defining and executing a uniquely labeled time coordinated motion instruction for communicating information among said plurality of controllers and wherein said controllers are arranged for synchronized execution of like labeled time coordinated motion instructions such that said instructions execute in such a way that they jointly begin at a first time, follow a common relative velocity profile, and jointly end at a second time.

Preferentially, said motion instruction source is local to the controller. However, in a alternative embodiment said motion instruction source which may be a control program, can also be remote from the controller.

Each robot controller contains at least one motion system capable of controlling attached robotic machines (robots).

However, the invention relates in particular to coordination problems between robots controlled by separate controllers. Each controller may also contain at least one motion instruction source, or it may contain no motion instruction source, and the motion instructions for that controller may originate remotely. The invention specifically relates to coordination problems where motion instruction sources are on separate controllers.

A motion instruction source includes but is not limited to instruction sources like a control program interpreter, a directly executed compiled control program, a manual motion pendant device, or any operator device designed to give a human operator control of robot motion.

Another aspect of the invention is the ability to link the motion of a "dependent frame of reference" associated with some point on one robot to an "independent frame of reference" associated with some point on a different robot controlled by a different controller. The motion of the dependent frame of reference depends on the motion of the independent frame of reference. When the independent frame moves, so does the dependent frame. However, if the dependent frame is moved the independent frame does not necessarily move.

To this end, the invention particularly relates to a system for controlling a plurality of robots, said system comprising a plurality of controllers, each having an associated motion system adapted to control attached robots; at least one of said controllers having at least one motion instruction source; a computer network over which said controllers communicate; at least one first controller of said plurality of controllers having a position sending system for sending a commanded position of said attached robot over said network; at least one second controller of said plurality of controllers having a position receiving system for receiving said commanded position over said network from at least one of said first controllers; said second controller arranged for defining at least one first robot reference frame with a fixed position relative to some point on said robot attached to said first controller (independent reference frame) and at least one second robot reference frame with a fixed position relative to some point on said robot attached to said second controller; said second controller arranged for maintaining a certain spatial transformation relationship (dependency relationship) between said second robot reference frame (dependent reference frame) and said independent reference frame; said relationship specified by said motion instruction source of said second controller.

Concerning the same aspect of the invention, the latter furtheron relates to a method for controlling a system of a plurality of robots, said system further comprising a plurality of controllers, each having an associated motion system adapted to control attached robots; at least one of said controllers having at least one motion instruction source; and a computer network over which said controllers communicate, wherein at least one first controller of said plurality of controllers sends a commanded position of its attached robot over said network, wherein at least one second controller of said plurality of controllers receives said commanded position over said network from said first controller, wherein said second controller defines at least one first robot reference frame with a fixed position relative to some point on said attached robot of said first controller (independent reference frame) and at least one second robot reference frame with a fixed position relative to some point on said attached robot of said second controller, wherein said second controller by using said commanded position maintains a spatial transformation relationship (dependency relationship) between said second robot reference frame (dependent reference frame) and said independent reference frame by moving its attached robot to maintain said transformation relationship and wherein said dependency relationship is defined by a motion instruction source of said second controller. Preferably said spatial transformation relationship is a Cartesian transformation relationship.

While association of a motion of one robot to that of another robot has been done in the prior art, prior systems have either focused on subjecting all of the robots to the control of common controller, or, where the robots are on separate controllers, such an association was only possible during the execution of specific control programs (see above).

According to the invention, a dependent frame of reference keeps its relationship to an independent frame of reference at all times, even while the corresponding controller switches between instruction sources. This is particularly important when switching from production operation to manual operation while two robots are carrying a part. Preferably, said spatial relationship is a Cartesian transformation relationship.

The invention provides this capability by maintaining knowledge of the independent frame of reference on the controller where the dependent frame of reference is defined. In this way, any instruction source providing motion instructions to that controller's motion system may provide those instructions relative to the independent frame of reference.

In order to achieve this, in a preferred embodiment of the inventive system, said second controller is arranged for maintaining said transformation dependency relationship between a dependent reference frame and an independent reference frame while there is no command from any one of said motion instruction sources of said second controller and/or when said second controller changes from one of said instruction sources to another. The persistent knowledge of the independent frame of reference is maintained in the background by a transmission of state information between the controller of the robot FOR which the independent frame is defined and the controller ON which the independent frame is defined. This in turn is done using a subscription by the controller ON which the independent frame is defined to the controller of the robot FOR which the frame is defined. Also, a controller for one robot may keep multiple subscriptions to different independent frames simultaneously.

In a preferred embodiment of the inventive method said second controller maintains said transformation dependency relationship between said dependent reference frame and said independent reference frame while there is no command from any of said motion instruction sources of said second controller and/or when said second controller is changing from one of said motion instruction sources to another.

In this way, using the inventive control method and system, several coordination problems can be solved over the prior art where robots are controlled by separate controllers:

- Positions may be taught relative to an independent frame of reference for use in motions of the robot where the dependent frame is defined. That is, according to a further embodiment of the inventive method a teaching system of said second controller, using said commanded position, records a taught position defined relative to said independent reference frame for later use, such that upon later use said second controller causes said second robot reference frame to follow a path prescribed by a motion instruction source of said second controller to said taught position. In a preferred embodiment of the inventive system a teaching system of said second controller is arranged for recording taught positions defined relative to an independent reference frame for later use.
- By moving the TCP of a robot to a position defined relative to an independent frame, the TCP becomes a dependent frame of reference, and this dependency remains persistent. Even after termination of the motion, the TCP remains dependent, and will move automatically whenever the independent frame moves. In general, according to a further embodiment of the inventive method said dependency is created by a motion of said second robot reference frame to a position defined relative to said independent reference frame from a position defined relative to a reference frame different from said independent reference frame. Accordingly, in the inventive system said motion instruction source of said second controller preferably is arranged for creating said dependency relationship between a second robot reference frame and said independent reference frame.
- The motion to a destination is automatically carried out relative to the independent frame of reference. The robot for which the independent frame is defined may be moved anytime and the motion issued by the instruction source for the dependent frame will remain the correct relative motion. In another embodiment of the inventive system said motion instruction source of said second controller is arranged for issuing a relative motion instruction such that said dependency relationship of said second controller is a motion of said dependent reference frame defined relative to said independent reference frame.
- Since the independent frame of reference is constantly maintained, manual motions may also be carried out relative to that frame of reference. When the manual motion stops, the dependent frame will stop relative to the independent frame.

It is possible to carry out a motion of a robot from a stationary frame, e.g. defined relative to world to an independent frame defined on a moving robot. In order to avoid an instantaneous change in velocity form 0 to the velocity of the moving independent frame, state information, such as velocity and acceleration of the independent frame may also be kept. Thus a smooth motion onto or off the independent frame may be planned. It is therefore also possible to issue motions of the TCP of a first robot from an independent frame on a second robot to an independent frame on a third robot. The TCP motion will start at 0 speed relative to the second robot, move smoothly and stop at 0 speed relative to the third robot. This capability is important to permit one robot to rendezvous with and depart from a frame of reference defined on a second robot.

Historically, in the prior art, this is similar to robots moving onto and off of moving conveyor systems. However, in those systems, the conveyor sensors are connected directly to the same controller as the robots. In the prior art where robots are on separate controllers, no such rendezvous and departure is provided for between one robot and another.

According to a further development of the inventive method said dependent reference frame defined with respect to a robot attached to a first controller is defined as an independent reference frame with respect to said robot by a different controller. This is true because a controller can subscribe to frame information from another controller at the same time it publishes the same information to a third. For example, this permits one robot to be taught weld points on a small part that is in turn held by a second robot relative to a large part held by a third.

While the previous aspect of the invention supports spatial coordination activities among robots, temporal coordination is sometimes also necessary. In the prior art, where two or more robots are controlled by the same controller, it is possible to move one robot simultaneously with another by simply issuing the motion from one control program instruction to both robots. This is necessary in order to coordinate a spatial relative motion of a robot R2 relative to a robot R1 simultaneously to a motion of robot R1. In prior art of arc welding for example, it is very common to move a robot relative to a table positioner in time coordination with the motion of that positioner. This is how a molten puddle can be kept in its intended run, e.g. horizontal while the robot traverses the weld seam.

However, when the instruction sources reside on separate controllers, a single instruction cannot be issued. Therefore, another aspect of this invention is to permit temporally synchronized motions from multiple motion instruction sources. As indicated above, the invention therefore involves a new kind of motion statement, communication and coordination between controllers to carry out synchronized motions on the separate robots. To this end, the system according to the invention is characterized in that said control program is arranged for defining and executing a uniquely labeled time coordinated motion instruction for communicating information among said plurality of controllers and wherein said controllers are arranged for synchronized execution of like labeled time coordinated motion instructions such that said instructions execute in such a way that they jointly begin at a first time, follow a common relative velocity profile, and jointly end at a second time.

As stated above, the synchronized motion statement uses a unique label on the statement. Each control program running on its own controller will wait at the synchronized motion statement for control programs on all other controllers to reach the same labeled statement. Then, each motion system running on its own controller will coordinate the motion planning of its motion along with all other controllers, so that all robots carry out their motions with the same motion profile. That is, they all start, accelerate, move at constant speed, and decelerate together, thus reaching their destinations at exactly the same time. The robot requiring the most time for its motion will govern all others to take the same time.

Another aspect of the invention is the improvement of accuracy by use of clock alignment. Several methods and standards now exist for aligning clocks across a communication line, as discussed above. However, it is necessary that interpolators and subinterpolators be aligned so that the actual output from servo systems occur at the same time.

Therefore, the system according to the invention preferably comprises an associated clock for each controller that produces timing information based on a temporal reference frame; and a system for supplying a synchronization signal to said controllers that periodically aligns the temporal reference frames of said clocks; said controllers being arranged for using said clocks to control said associated motion systems such that said attached robots controlled by said motion systems operate with clock-alignment.

Accordingly, the inventive method preferably is characterized in that an associated clock in each controller produces timing information based on a temporal reference frame; wherein a system for supplying a synchronizing signal to said controllers periodically aligns the temporal reference frames of said clocks; and wherein said controllers use said clocks to control said associated motion systems such that said attached robots controlled by said motion systems operate with clock-alignment.

The invention thus provides for the hardware clocks on the plurality of robot controllers to be aligned with each other so that the subinterpolation intervals are aligned, and it provides for interpolator interval alignment as well.

In a preferred embodiment of the inventive system said clocks are hardwired to said controllers.

In another preferred embodiment of the inventive method a signal with a first frequency and phase is used to adjust the phase of one of said clocks operating at a second higher frequency on each of the plurality of controllers to make the phases of said higher frequency clocks the same in all of said plurality of controllers; and wherein said first frequency signal is proportional to the out-of-phase-ness. To this end, in another embodiment of the inventive system, said clocks are connected to said controllers via phase locking means, said phase locking means comprising a serial synchronizing connection and/or an Ethernet connection.

The result is that time coordination in time synchronized motions is nearly perfect, and no position alignment error due to clock alignment is introduced in spatially coordinated motions.

The invention will now be described in more detail with reference to the accompanying drawings which show preferred embodiments of the inventive method and system.

DETAILED DESCRIPTION OF PREFERRED EMBODIMENT

Figure 1:
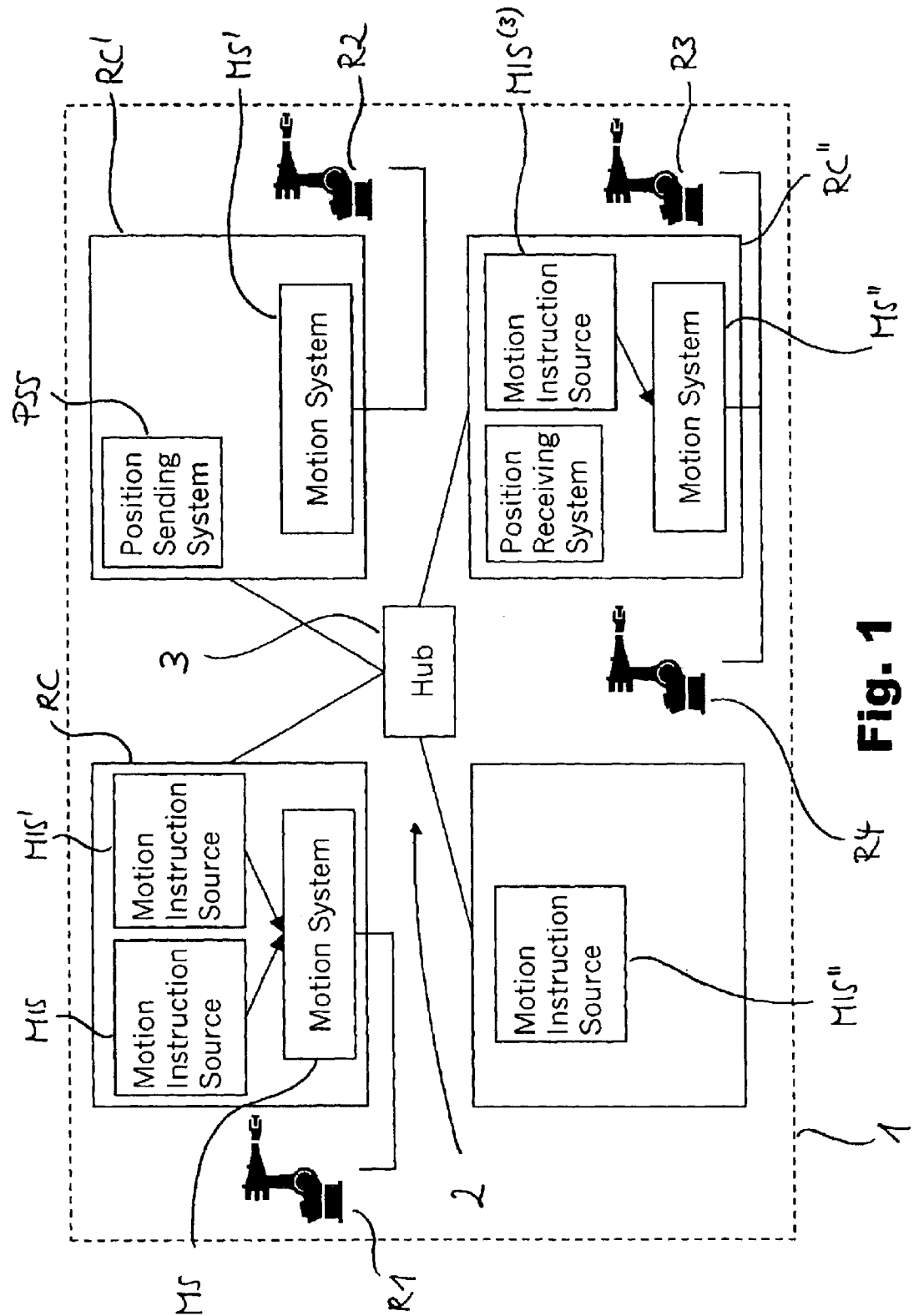
FIG. 1 is a diagram of the general system architecture supported by the invention.

FIG. 1 illustrates the general architecture of a control system according to the invention. Inside a work cell 1 are present multiple robots R1–R4. Each robot R1–R4 is connected for signal transmission to a robot controller RC–RC", whereby multiple robots R3, R4 can be connected to a common controller RC". Each controller RC–RC" has an associated motion system MS–MS" and is arranged to receive motion instructions from at least one motion instruction source MIS–MIS$^{(3)}$ which can be either local to the controller, e.g. motion instruction sources MIS, MIS', MIS$^{(3)}$ or remote from the controller as is the case for controller RC' in FIG. 1.

At least one MIS" of the motion instruction sources may be devised as a control program.

The individual controllers are physically linked via a computer network 2, which in the embodiment shown in FIG. 1 comprises a hub 3 for communication distribution services. An important point conveyed by FIG. 1 is that all aspects of the invention are valid whether motion instruction sources MIS–MIS$^{(3)}$ are on the same controller or different controllers. Furtheron, one robot controller RC' has a position sending system PSS for communicating positions of its attached robot R2 over the network 2. Another controller RC" has a corresponding position receiving system PRS for receiving said positions over the network 2.

Figure 2:
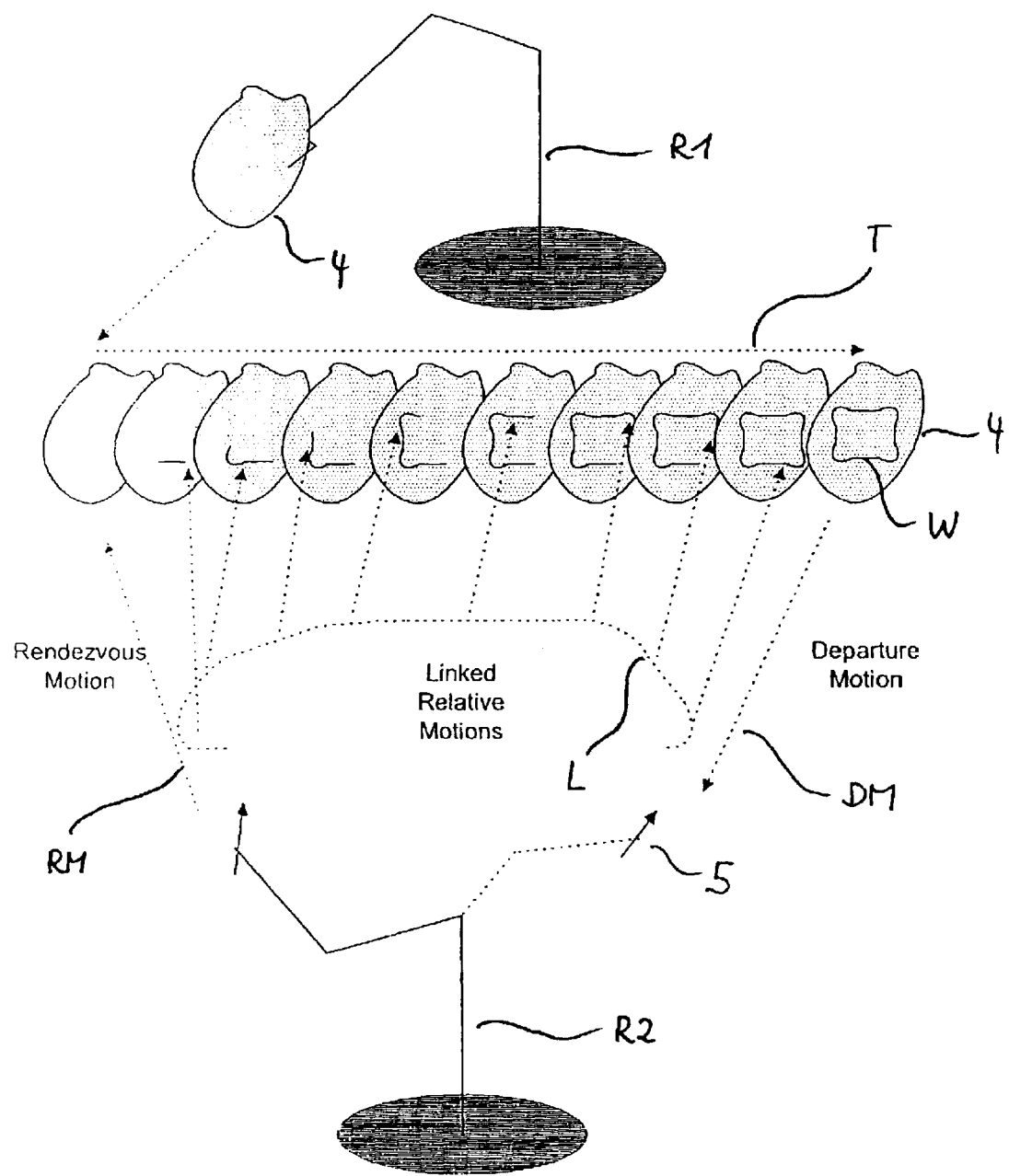
FIG. 2 shows an example of linked motion of two robots.

FIG. 2 shows an example of linked motion involving two robots R1, R2. One robot R1 carries a part 4 along a motion trajectory T (though the latter need not be a straight line), while another robot R2 carries out a process relative to the part 4, such as arc welding along a weld line W. An important aspect of the invention illustrated in FIG. 2 is that the process robot R2 can rendezvous (rendezvous motion RM) and depart (depart motion DM) from the part 4 while the latter is in motion along the trajectory T. During processing of part 4 by robot R2, the two robots are in linked relative motion, robot R1 along the trajectory T and robot R2 along a generally curved trajectory L.

Figure 3:
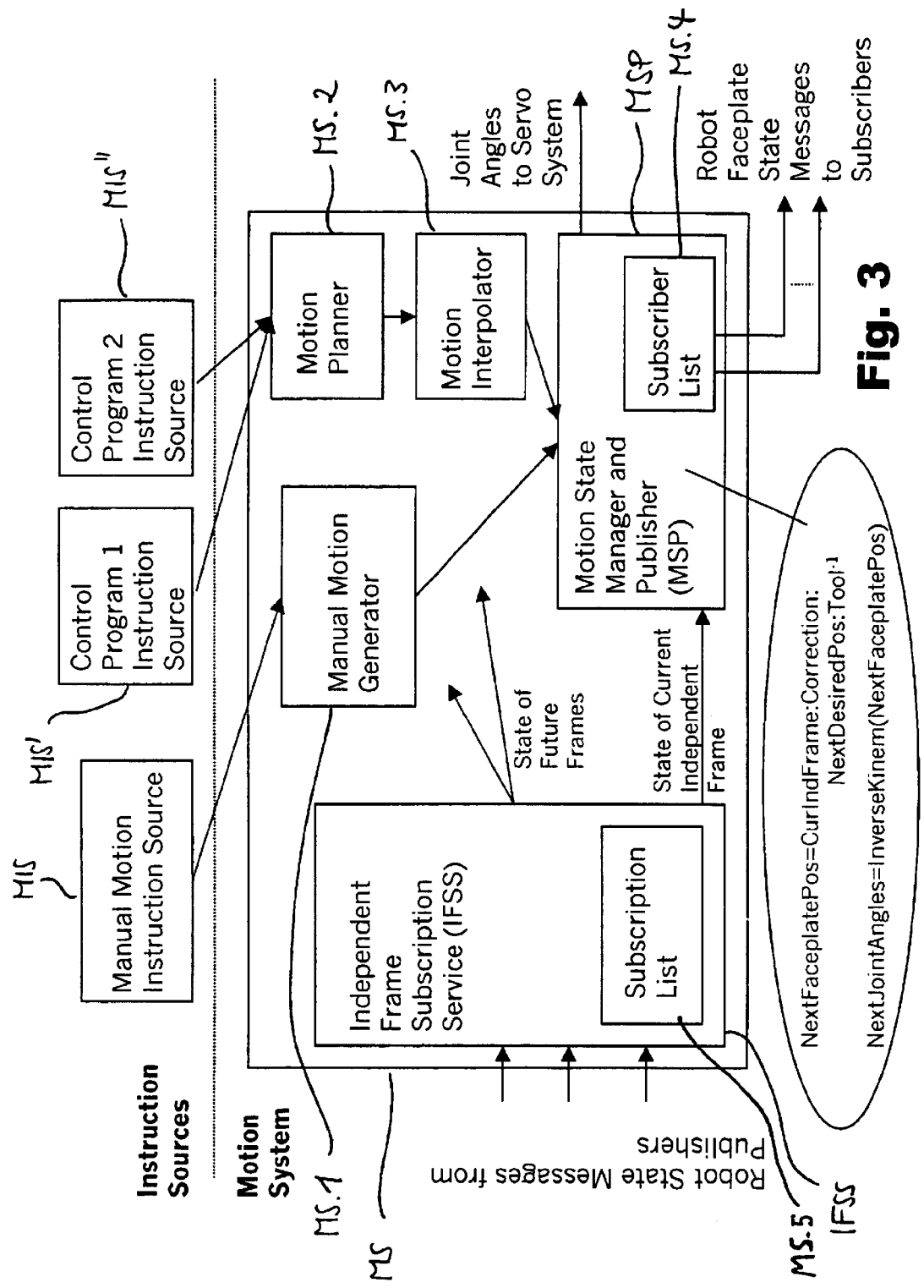
FIG. 3 is a diagram showing the task level architecture of the preferred embodiment.

The overall task architecture of the preferred embodiment is shown in FIG. 3. It assumes a tasking architecture which can be supported by many commercial real-time operating systems available today. The motion system task architecture is divided between motion instruction sources MIS–MIS" (cf. FIG. 1) which are internally or remotely connected to a motion system MS associated with a robot controller RC (FIG. 1).

The motion system MS comprises a manual motion generator MS.1 in connection with manual motion instruction sources MIS, e.g. teaching pendants etc., if the latter are present. Software-implemented instruction sources, i.e. control programs MIS', MIS" are connected to a motion planner MS.2 which relays information to a motion state manager and publisher MSP via a motion interpolator MS.3. Information generated by the motion generator MS.1 is relayed directly to the MSP.

The MSP comprises a subscriber list MS.4 containing information, e.g. network addresses of multiple subscribers on the other controllers who have defined independent reference frames associated with robots attached to the present controller. These subscribers may include manual motion systems, planners, and interpolators such as MS.1, MS.2 and MS.3, respectively.

Further shown in FIG. 3 is an independent frame subscription service IFSS for gathering robot state messages from individual publishers, i.e. the MSPs of motion systems MS on another controller as shown in FIG. 3. Through a subscription list MS.5 the IFSS relates independent frames defined on the current controller to robot motion state publishers of other controllers.

Key aspects of the architectures that support the invention are:

- the background Independent Frame Subscription Service task IFSS for maintaining updated state information about remote frame publishers whether programs are running or not and whether relative motions are in-progress or not;
- a Motion State Manager task for maintaining the position of a robot relative to a remote independent frame, independent of whether programs are running or not and whether relative motions are in-progress or not; and
- the motion state of a robot being kept persistent relative to a remote independent frame for either manual motions or programmed motions or during transitions between them.

The following points are to be noted with respect to the embodiment shown in FIG. 3:

Multiple instruction sources MIS-MIS" may be present simultaneously. This includes a manual motion source MIS and multiple control program instruction sources MIS', MIS". The dotted line below these in FIG. 3 indicates that the instruction sources may reside on the same or different controller as the motion system controlling the robot (FIG. 1).

The architecture shown permits continuous and persistent linking between a dependent reference frame on one robot and the independent reference frame defined on another robot while changing between motion instruction sources located anywhere and including either manual motion sources or control program instruction sources, and at includes such persistence even while no motion instruction is coming from any motion source.

Various motions can be planned or executed which make use of multiple different independent reference frames simultaneously as shown by messages coming from multiple publishers to the Independent Frame Subscription Service IFSS and by that service's ability to update planners, interpolaters, and manual motion systems simultaneously. Functioning of the IFSS is described in detail below. In this way, it is possible to plan a motion from a currently moving independent reference frame to another moving independent reference frame, wherein such motion is to be started sometime in the future.

The Motion State Manager is able to publish a robot's faceplate position to multiple subscribers simultaneously. For motion planning, the Planner MS.2 uses an estimate of the future position of an independent reference frame. In this way, when the actual motion in that frame begins, a correction factor is started and interpolated to nil by the Motion State Manager MSP. This is how motions between various moving reference frames can be handled smoothly and with advanced planning. These kinds of motions are generally transition motions that do not require substantial precision. Precision motions are generally generated in the same frame of reference, where no correction is needed between motions.

The motion systems architecture can work in the presence of servo and interpolation clock synchronization between robot controllers or in the absence of such synchronization. There is also no requirement that the interpolation interval of two robot controllers be the same. Each component of the architecture assumes that wherever an independent frame is needed, its full state is available, including at least its velocity and position. Other derivatives, e.g. acceleration may optionally be present.

In the presence of clock synchronization, it is assumed that each robot controller generates its faceplate updates at the same rate and at nearly the same relative times within its interpolation interval. Chaining is then suppored in the following way: The MSP of each robot waits for up to a fixed amount of time for the frame update from its remote publisher, to which it is subscribed. This delay is sufficient for two or more successive robot controllers to compute their faceplate position and pass them on to their subscribers. All controllers will then update their servo systems at exactly the same time on the subsequent clock tick.

In the absence of clock synchronization, a timeout from the above delay may occur. In this case, an estimate of the publisher's frame state is made, based on previously updated positions and velocities and the known time interval from the update time to the current time.

In practice, the estimate of frame state is always used. However, when clock synchronization is used, the time interval between update and usage of said estimate is 0 clock intervals, and thus the position is accurate.

Details of these general ideas are now presented in the following paragraphs:

The Motion State Publisher MSP can also act as a motion state manager. One of the key ideas of the invention is that it must be possible for a robot to remain in motion while there is no motion actually being generated on the controller for that particular robot. In a typical robot controller according to the prior art, when the interpolator has finished interpolating a particular motion, motion of the robot stops. Similarly, if under manual motion control, when the operator lifts a button causing motion, motion stops.

In the preferred embodiment according to the invention, the MSP permits linked motion to continue in the absence of motion from the above entities. Together with the IFSS, described in detail below, these two components provide a significant difference from the prior art that permit the solution of all the previously described coordination problems.

Planning of motions is generally done in advance of their actual execution: It is therefore possible that an assumed starting position is slightly different than the actual starting position, because in the case where the new motion is relative to a different frame than that of the current motion, that new frame might have taken a slightly different trajectory than assumed by the Planner or Manual Motion Generator.

The MSP generates a small correction transformation at the beginning of each motion, so that such a transition motion from one frame to another frame is smooth. The correction transform is then interpolated to nil during the motion using a well known single-angle interpolation algorithm, so that the terminal position is exactly correct relative to the new frame. The single-angle interpolation algorithm determines the common normal vector between like coordinates of the assumed and actual starting position and then interpolates the rotation about that vector from actual to assumed starting position. This interpolation occurs linearly throughout the course of the motion.

Furtheron, the MSP is responsible for the final calculation of the robot's faceplate position and joint angles for each interpolation interval. It is thus responsible for publishing that position to subscribers that have defined independent frames of reference relative to this robot's faceplate. This supports chaining of reference frames.

The MSP additionally supports linking and chaining with and without servo and interpolation clock synchronization in the following way: When it requests independent frame state update from the IFSS it does so by specifying an allowable timeout value. The IFSS will then satisfy the update request with the actual update if it occurs prior to timeout (the normal case with clock synchronization) or with an estimate if the timeout occurs before an update takes place (possible without clock synchronization).

Figure 4A:
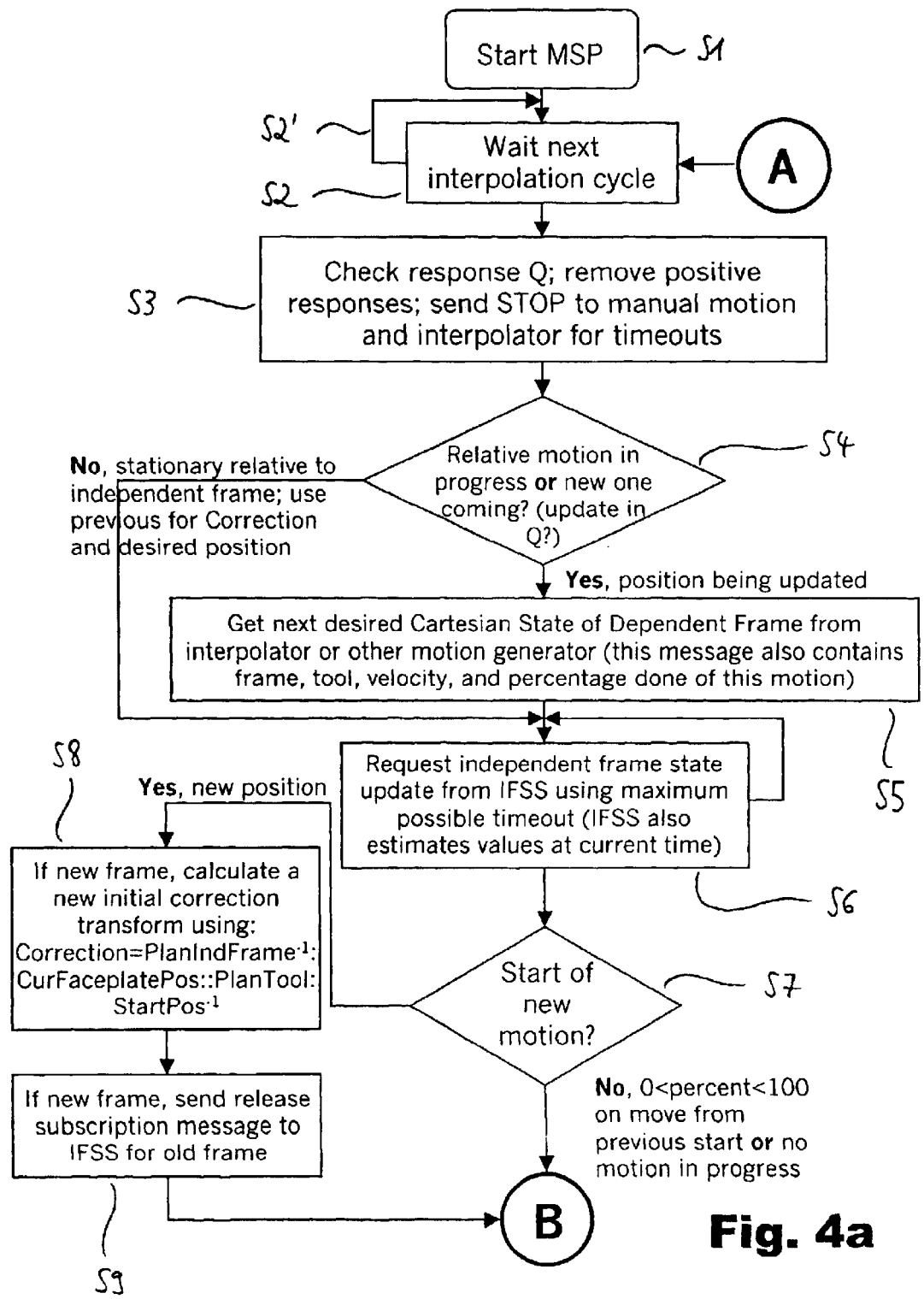
FIGS. 4a, 4b show a flow diagram for the Motion State Publisher task.
Figure 4B:
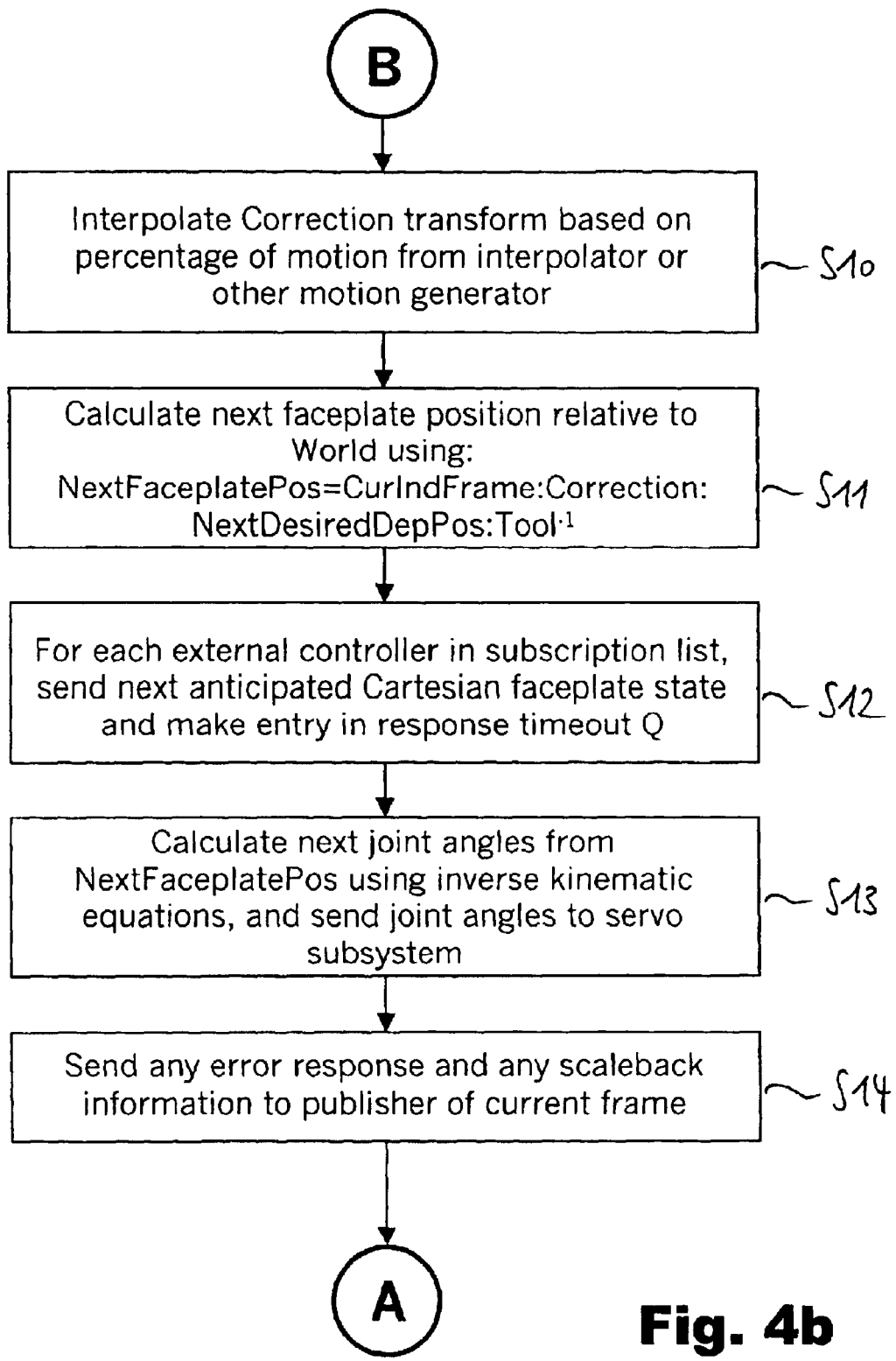

Referring to the details of the flowchart in FIGS. 4a, 4b the MSP performs the following operations:

After the MSP starts in step S1 (FIG. 4a), the MSP task first waits for the next interpolation cycle of the robot control in step S2, e.g. by repeatedly checking for a corresponding signal issued by a motion interpolator or other motion sources (not shown) as illustrated by loop S2'. Previous cycles of the MSP may have generated messages to subscriber tasks and entries for those messages may have been entered in a response Q. At step S3, this response Q is checked. Positive responses from previous messages are simply removed. However, if no response came within a critical timeout period for an entry in this Q, this is a serious error. In case of a timeout for an entry in this Q, a STOP messages will be sent to the motion source (interpolator or manual motion generator).

In a subsequent step S4, the MSP checks for relative motions in progress and for upcoming new relative motions, which are characterized by updates in Q. If there are such motions present, position is being updated and the MSP will get the next desired Cartesian state of a dependent frame from an interpolator or another motion generator (step S5). Preferably, the state message also contains a description of the frame (e.g. in terms of axes' orientation) as well as information on tools, velocities and the percentage of motion that has already been carried out. The absence of such motions characterizes a stationary state relative to an independent frame such that previous values can be used for correction and desired position, and the task proceeds directly to step S6, wherein the MSP requests independent frame state update from the IFSS (FIG. 3) using a maximum possible timeout. In the case where clock synchronization is used between controllers, the IFSS will respond within this timeout period with an update that represents an independent frame from a different controller in the same clock interval. When clock synchronization is not used, the IFSS will usually timeout, and in that case it will estimate the independent frame position for the current time.

In a subsequent step S7, the MSP checks whether or not this is the start of a new motion. In case of a new motion, the MSP assumes a new start position and calculates for a new frame a new initial correction transform (step S8). Subsequently, if the new motion uses a new frame, then a message is sent to the IFSS (FIG. 3) to release (unsubscribe) the old frame (step S9). If there is no new motion, there either is no motion in progress, or an ongoing motion is not yet complete (somewhere between 0 and 100% complete).

In this case, the task is resumed directly in step S10 (FIG. 4b), wherein the correction transform (step S8; FIG. 4a) is interpolated based on the percentage of motion from an interpolator or another motion generator. In subsequent steps S11–S14 (FIG. 4b), the MSP calculates a next faceplate position relative to World (step S11); for each external controller in the subscription list (FIG. 3), sends the next anticipated Cartesian state of the faceplate over the communication network (cf. FIG. 1) and makes corresponding entries in a Q (step S12) to check for responses from the faceplate messages in a subsequent cycle (step s3 of the next cycle); calculates next joint angles from the next faceplate position (cf. step S11) using inverse kinematics equations and sends joint angles to a servo subsystem (not shown; step S13); and sends any error response and scale back information to the publisher of the current frame (step S14).

The IFSS is the second component along with the MSP that significantly differentiates the architecture of the present invention from the prior art. The IFSS performs the following basic functions:

it maintains a list of independent frames that are defined relative to one or more remote robot's faceplates. There can be multiple frames defined for each faceplate. For example, the Planner MS.2 (FIG. 3) can be planning a motion at the same time the interpolator is carrying out a motion. The planner could be planning a motion relative to a gripper, while the interpolator is performing a motion relative to a part in the gripper. Both the gripper and the part represent independent frames being kept by the IFSS for simultaneous use by the system. Or the Planner can be planning a motion relative to a gripper on one robot while the interpolator is carrying out a motion relative to the gripper on another robot;

it maintains a subscription list of remote robot faceplates. The IFSS subscribes to a remote faceplate when the Planner MS.2 or Manual Motion Generator MS.1 is planning a new motion to a new frame using a new faceplate. The IFSS unsubscribes from a remote faceplate when the MSP is finished with a motion relative to the last frame defined relative to that faceplate. Note that this is usually not at the end of a motion's interpolation by the Interpolator, but rather when a new motion is initiated to a frame relative to a different faceplate.

Each new frame request generates a new subscription ID, even if the frame is already being used. That ID is passed along from Planner to Interpolator, and to MSP. When the MSP is finished with a frame ID, it sends a release subscription message to IFSS. If said ID is the last ID remaining for a particular frame, that frame is released, and if the frame is the last one referencing a particular faceplate, an unsubscribe command is sent to the publisher, and the faceplate is released;

it updates all the frames referencing a certain faceplate. This includes transforming the incoming faceplate position, velocity, and any other state information to the independent frame and recording the update time. This information can then be used for subsequent frame state estimation at a future time; and it responds to frame update requests from the Planner, Manual Motion Generator, or MSP.

Figure 5A:
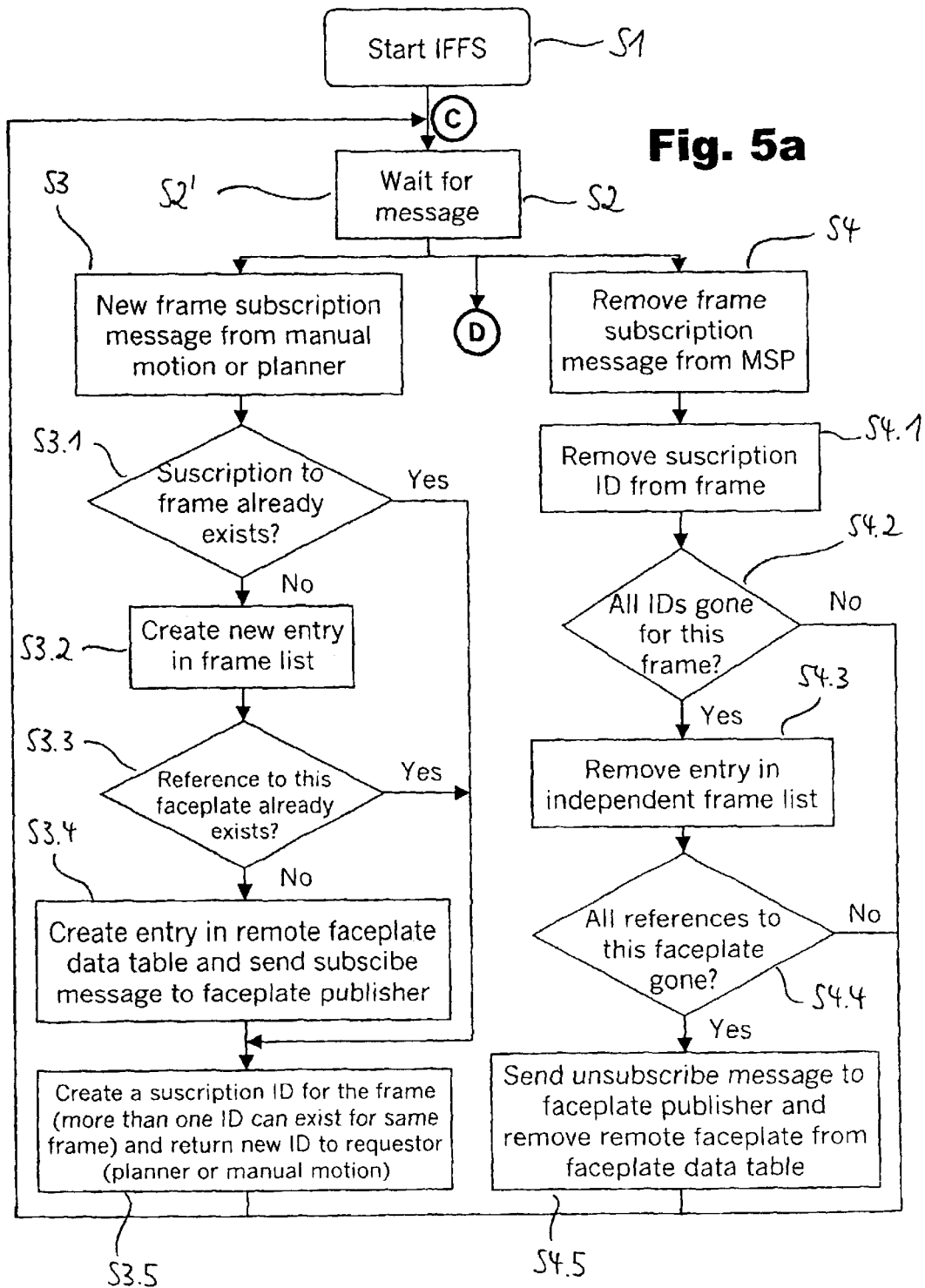
FIGS. 5a, 5b show a flow diagram for the Motion Independent Frame Subscription Service task.
Figure 5B:
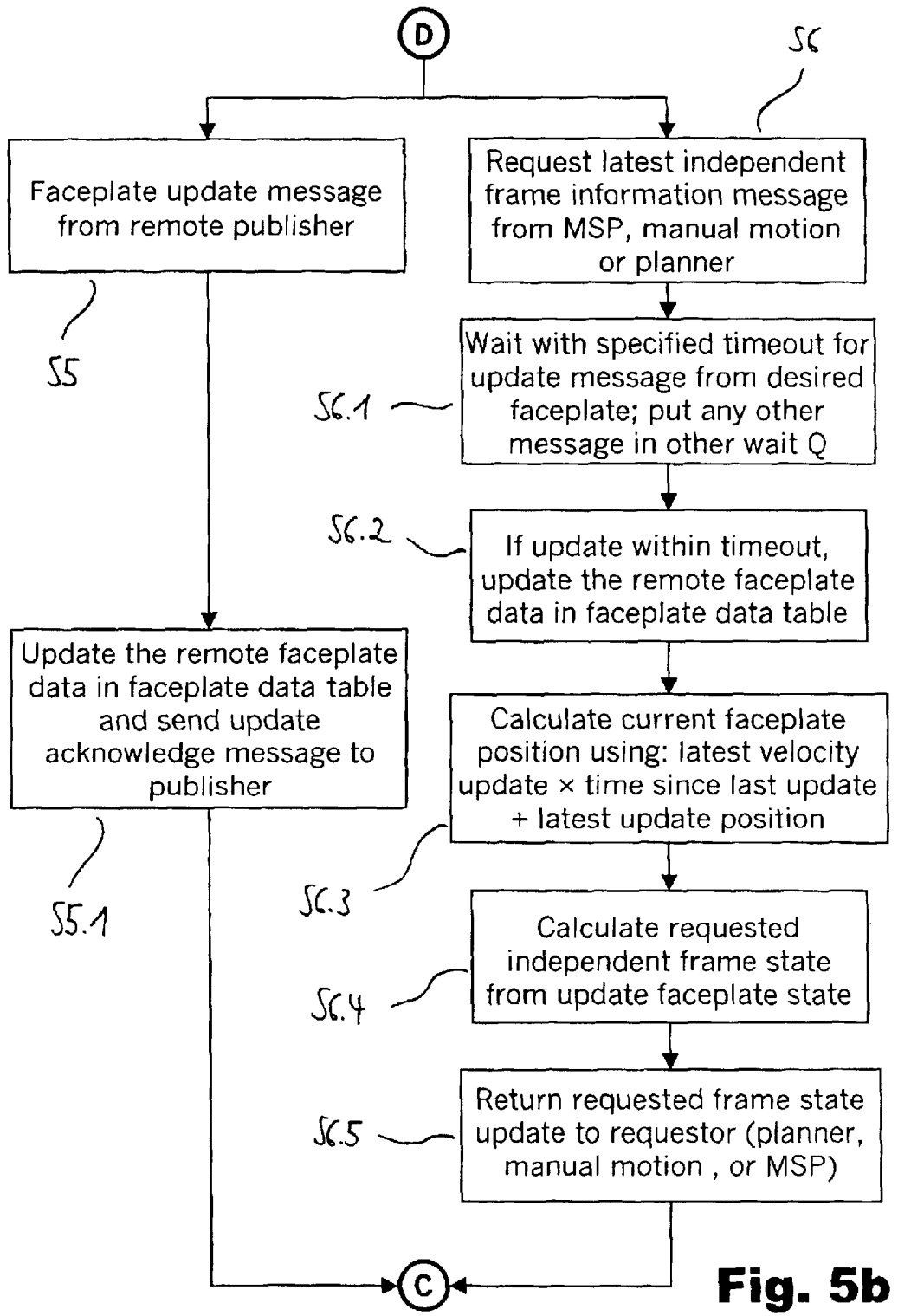

Referring to the details of the flowchart in FIGS. 5a, 5b, the IFSS performs the following operations:

The IFSS is started in step S1 (FIG. 5a). It then waits for a message in step S2 (loop S2'), which can be 1) a new frame subscription message from manual motion or planners (step S3; FIG. 5a); 2) a remove frame subscription message from the MSP (sep S4; FIG. 5a); 3) a faceplate update message from a remote publisher (step S5; FIG. 5b); or 4) a request for latest independent frame information message from the MSP, manual motion or planner (step S6; FIG. 5b).

If the message in step S2 is a new frame subscription message (step S3; FIG. 5a), then the IFSS checks in a subsequent step S3.1 whether or not subscription to that frame already exists. If a subscription exists, the task is resumed in step S3.5 (see below). Otherwise, in step S3.2 a new entry is created in a list of independent frames. Then, in step S3.3, it is checked whether or not a reference to the faceplate referenced by that independent frame already exists. If such a reference exists, the task is resumed in step S3.5, otherwise in step S3.4 an entry is created in a remote faceplate data table and a subscribe message sent to the faceplate publisher. In subsequent step S3.5 the IFSS creates a subscription ID for the frame, with more than one ID possible for the same frame. Furtheron, the new ID is returned to the requester, which can be a motion planner or a manual motion interface. The task is then continued in step S2.

If the message in step S2 is a remove subscription message (step S4; FIG. 5a), then the subscription ID is removed from the frame (step S4.1) and the IFSS checks whether or not all IDs for that frame have been removed (step S4.2). If there are still some IDs left, the task is resumed in step S2. Otherwise, its entry is removed from the independent frame list (step S4.3). If all references to that particular faceplate have been deleted (step S4.4) then in step S4.5 a unsubscribe message is sent to the faceplate publisher and the remote faceplate is removed from the faceplate date table. Otherwise or afterwards, the task is resumed in step S2.

If the message in step S2 is a faceplate update message (step S5; FIG. 5b) then the remote faceplate data is updated in the faceplate data table and a message sent to the publisher to acknowledge the update (step S5.1). The task is then resumed in step S2.

If the message in step S2 is an independent frame request message (step S6; FIG. 5b), then the IFSS waits with specified timeout for an update message from a described faceplate. Any other messages are put in another wait queue (step S6.1). Step S6.1 is repeated until the update message is received as illustrated by loop S6.1'. Then in a subsequent step S6.2, the remote faceplate data in the faceplate data table is updated for an update within timeout (step S6.2). The IFSS then calculates current faceplate position in step S6.3 using: (latest velocity update)×(time since latest update)+(latest update position). In step S6.4, the requested independent frame state is calculated using the current faceplate calculated in step S6.3 plus the stored offset from the faceplate to the requested independent frame. In step S6.5, the requested frame state update is returned to the requester. The task is then resumed in step S2.

The Planner task (MS.2; FIG. 3) serves the basic function of calculating various parameters of the motion for later use by the interpolator. The planning of a motion is typically done a full motion ahead of the actual execution of a motion by the interpolator. This planning normally occurs in parallel with execution of the previously planned motion by the interpolator. In case where several motions are queued, i.e. waiting for execution, planning may occur several motions ahead of the actual interpolation of the motion.

Among the variables needed for planning a motion are the beginning and ending states of the motion, including at least starting position and velocity and ending position and velocity. Since a motion is planned for a particular tool center point TCP (tool), and a particular frame of reference (frame), the states of the tool and frame for the motion must also be known at the time of planning. On a single controller, planning motions only for the robot attached to that controller and with no outside sensor influences, all required tool, frame, and starting state information is static and can thus be used at any time prior to the motion.

However, the assumption in the present invention is that each motion may be defined with respect to a new frame of reference, which may in turn be defined relative to a moving faceplate of a remote robot. Further, the state of the frame needed for planning may not be up-to-date at precisely the time the planning is done. Even if planning were done at precisely the start of interpolation, unless clock synchronization is used, the independent frame information may not be exactly up-to-date at that time.

A key aspect of the architecture in the preferred embodiment according to the invention is the IFSS, which supports estimation of future values of independent frames of reference defined relative to a remote faceplate. The IFSS will subscribe to and receive updates for the required remote robot. It will also convert the updated remote faceplate state to the independent frame of reference required by the Planner MS.2 (FIG. 3). Because full state information is maintained, including position and at least velocity of the independent frame, the Planner can then predict the position of the frame at the time the motion will be executed by the interpolator.

Figure 6A:
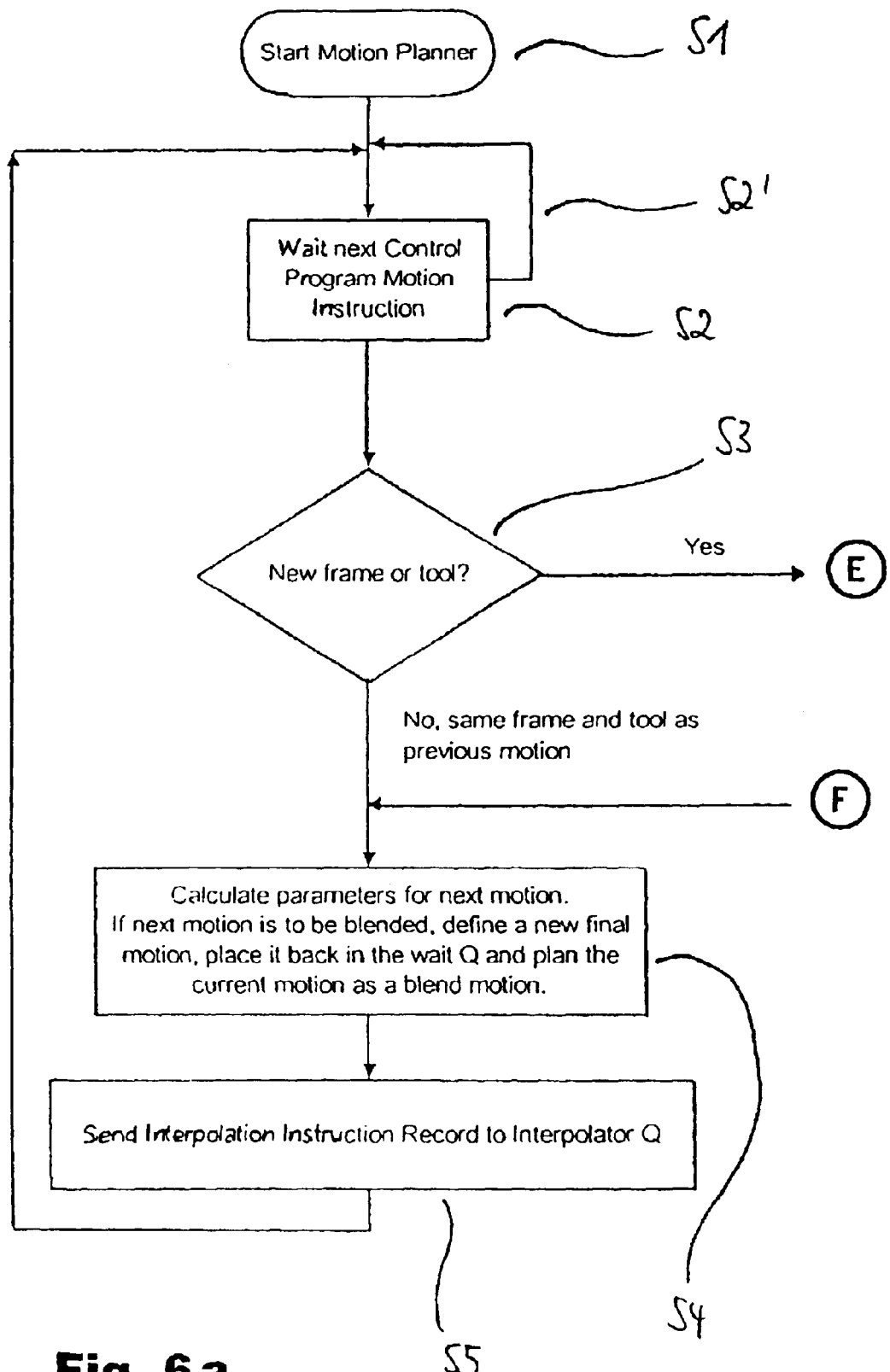
FIGS. 6a, 6b show a flow diagram for the Motion Planner task.
Figure 6B:
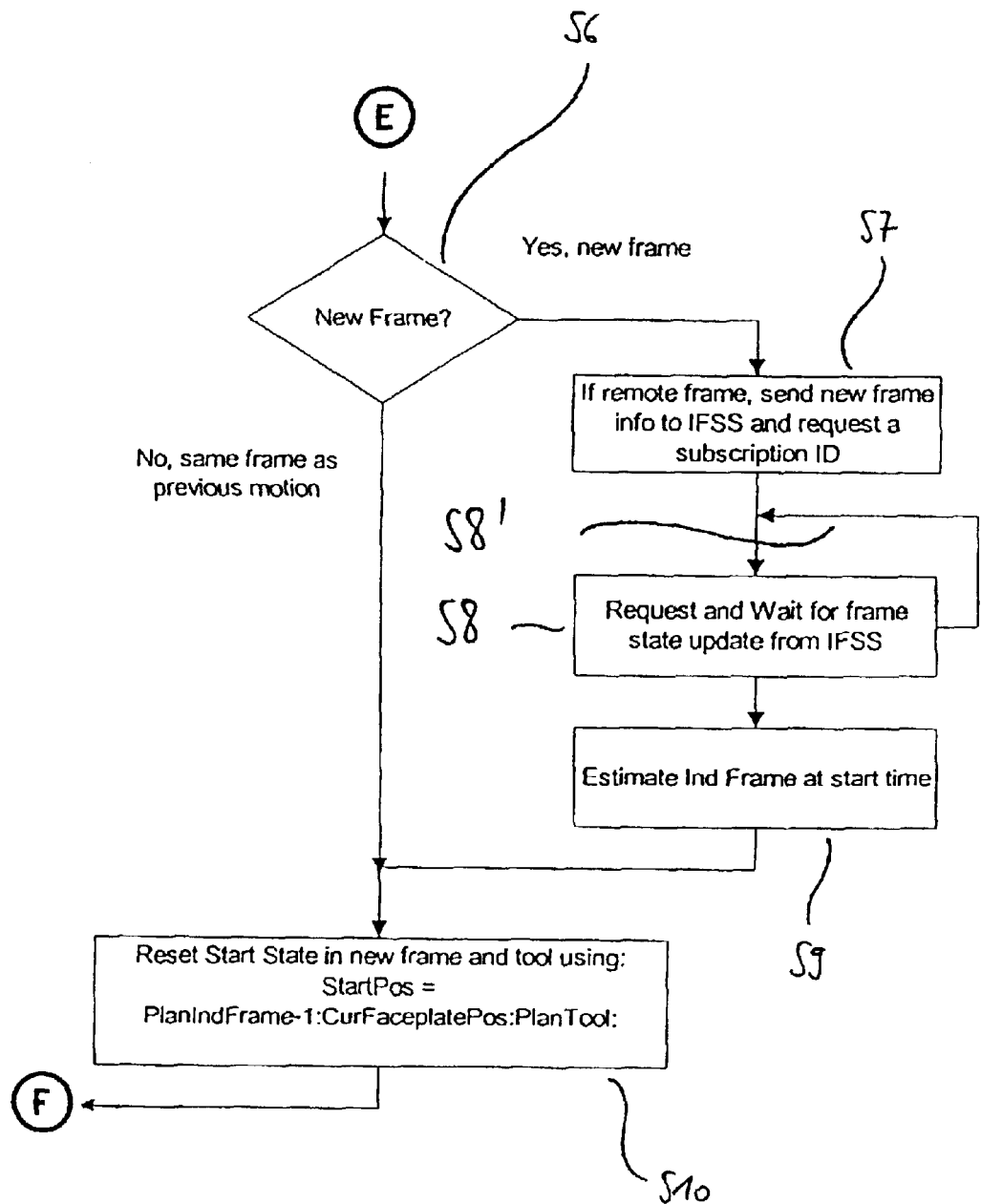

Referring to the details of the flowchart in FIGS. 6a, 6b the Planner performs the following operations:

After start of the Motion Planner in step S1 (FIG. 6a), it waits for a next Control Program Motion Instruction in step S2. Again, waiting is illustrated by loop S2'. After such an instruction has been given, the task checks in step S3 whether or not a new frame or tool has been added. If such a change has not occurred then it calculates parameters for the next motion in step S4. If the next motion is to be blended, i.e. a smooth transition between old and new motion states is to be performed, a new final motion is defined, placed back in the wait queue, and the current motion is planned as a blend motion, i.e. a motion that will join the new final motion smoothly in at least some of its parameters. Then, in step S5, an interpolation instruction record is sent to the interpolator queue, and the task is continued in step S2.

If a new frame or tool is detected in step S3, then the task further distinguishes between situations with a new frame and situations without a new frame in step S6 (FIG. 6b): if a new frame is detected then, in step S7, for a remote frame the new frame information is sent to the IFSS together with a request for a subscription ID. Then, in step SB, the task waits and repeatedly checks (loop S8') for a frame update from the IFSS before estimating a independent frame at start time in step S9.

Then or in case no new frame was found in step S6, in step S10 a start state in the new frame and/or tool is reset. The task is then resumed in step S4 (FIG. 6a).

The calculations performed in the Interpolator of the preferred embodiment are typical of existing robot controllers. However, instead of sending intermediate state information to a servo subsystem, in this case the state information is sent to the MSP, which in turn may apply a correction factor. The Interpolator passes its current percent of motion completion, so that the MSP may apply its interpolated correction factor for the same percentage of completion. In addition, the Interpolator passes the subscription ID of the independent frame and the tool to be used. The MSP will continue to use this same frame and tool for evaluating and updating dependent frame state after the motion is completed by the Interpolator.

Figure 7:
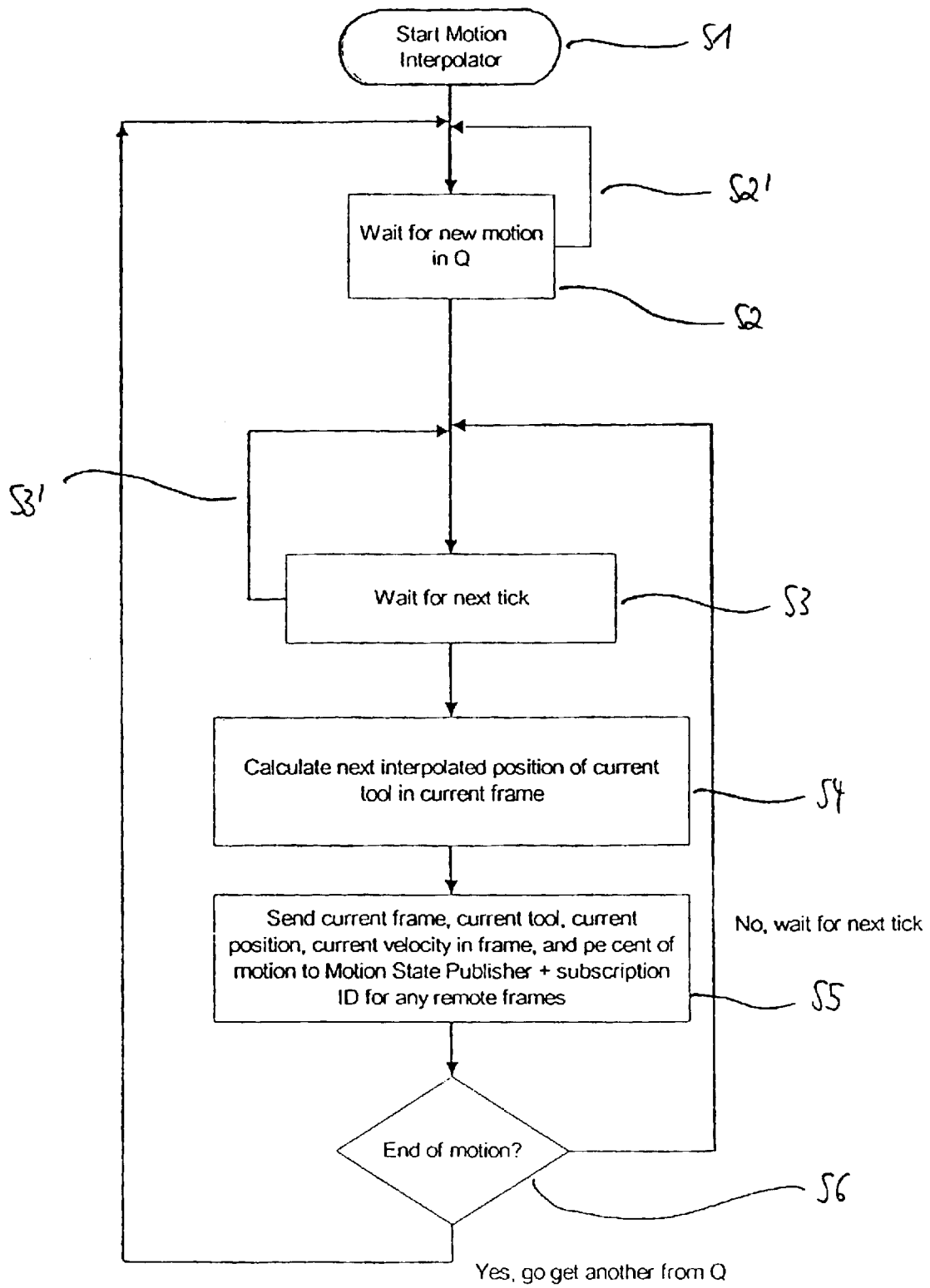
FIG. 7 is a flow diagram for the Motion Interpolator task.

Referring to the details of the flowchart in FIG. 7 the Interpolator according to the invention performs the following operations:

After start in step S1, the interpolator task waits for a new motion in queue Q (step S2), which is checked repeatedly (loop S2'). When such motion has been detected the interpolator waits for the next tick of an interval clock (step S3; loop S3') and then calculates the next interpolated position of a current tool in a current frame (step S4). Current frame, tool, position, velocity in frame and motion percentage (percentage of motion already accomplished) are then sent to the MSP along with a subscription ID for any remote frames (step S5). In a subsequent step S6, the task performs a check as to whether or not the motion has ended. If this is the case, the task fetches another from the waiting queue in step S2, otherwise the task is resumed in step S3.

The function of the Manual Motion Generator (MS.1; FIG. 3) is assumed to be typical of existing robot controllers, with the exception that it is modified in exactly the same way as previously described for the Planner to make use of estimated frames of reference from the IFSS and to pass interpolated state and subscription ID information to the MSP in a way similar to the Interpolator.

Figure 8:
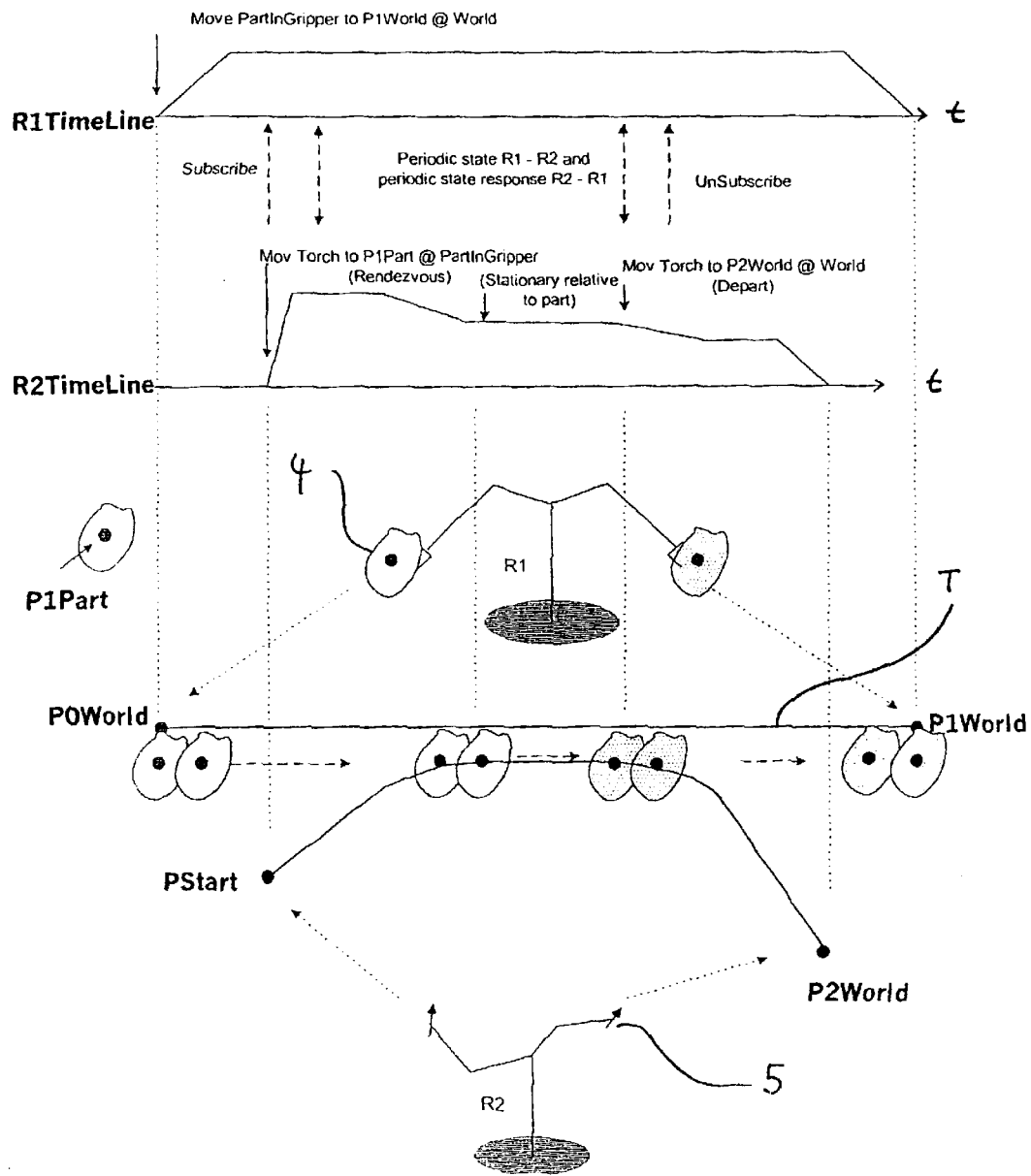
FIG. 8 shows messages and timing for a typical linked motion.

FIG. 8 shows a timing diagram (timelines t) and simple linked motion of two robots R1, R2. Robot R1 carries a part 4 along a straight line T between end points P0World, P1World which are defined in World coordinates. Robot R2 moves a welding torch 5 to the part 4 while the latter is in motion, stops relative to the part 4, then departs from the part 4, and moves back to a point P2World defined relative to World. Following is a description of the communication that occurs during these motions:

motion of R1 along line T is caused by "Move PartInGripper to P1World@world", where "X@y" generally denotes a position X (point) defined in a particular frame of reference y. This moves the part held in R1's gripper along the straight line T to position P1World, which is defined relative to World coordinates, e.g. workcell coordinates. No communication is caused by this motion;

a program on R2 issues "Move Torch to P1Part@PartInGripper". Since PartInGripper is an independent frame of reference defined on a remote robot (R1), a message is sent to R1 by R2's IFSS to subscribe to R1's faceplate state information. From that time on, R1 cyclically sends its faceplate to R2 as previously described. R2's IFSS task will respond with acknowledge messages;

R2's Planner task will plan a motion from 0 velocity relative to World to 0 velocity relative to "PartInGripper" and from a start position Pstart to final position, P1Part, defined relative to the Part. This motion is carried out by R2's interpolator and MSP tasks together;

when the motion of R2 is complete, R2's tasks keep the torch 5 at a fixed position relative to the part 4 and at vanishing relative speed to the part. The periodic state messages and responses continue between R1 and R2;

R2 issues "Move Torch to P2World@World". R2's Planner plans a motion from 0 velocity relative to the part to 0 velocity relative to World and to the final position P2World defined in World coordinates. This motion is carried out by R2's Interpolator and MSP tasks together;

R2's MSP task unsubscribes from the PartInGripper frame as soon as the motion to P2World begins, because PartInGripper is no longer in use, and the faceplate for which it is defined has no other frames defined relative to it in current use;

all message traffic stops. The two robots are again completely independent from each other.

Important aspects of the diagram shown in FIG. 8 include:

Messages flow in both directions between the two robots involved in the linked motion: the state update message from publisher to subscriber and response messages from subscriber to publisher. In this way, a communication failure can be detected by the publisher, or a failure on the subscriber robot can be detected, and the robot supporting the independent frame can be stopped.

Rendezvous and departure motions RM and DM, respectively, are shown. The robot with the dependent frame must plan motions to non-stationary positions during rendezvous, accelerate to moving targets, and decelerate from moving start positions when departing to stationary positions.

Figure 9A:
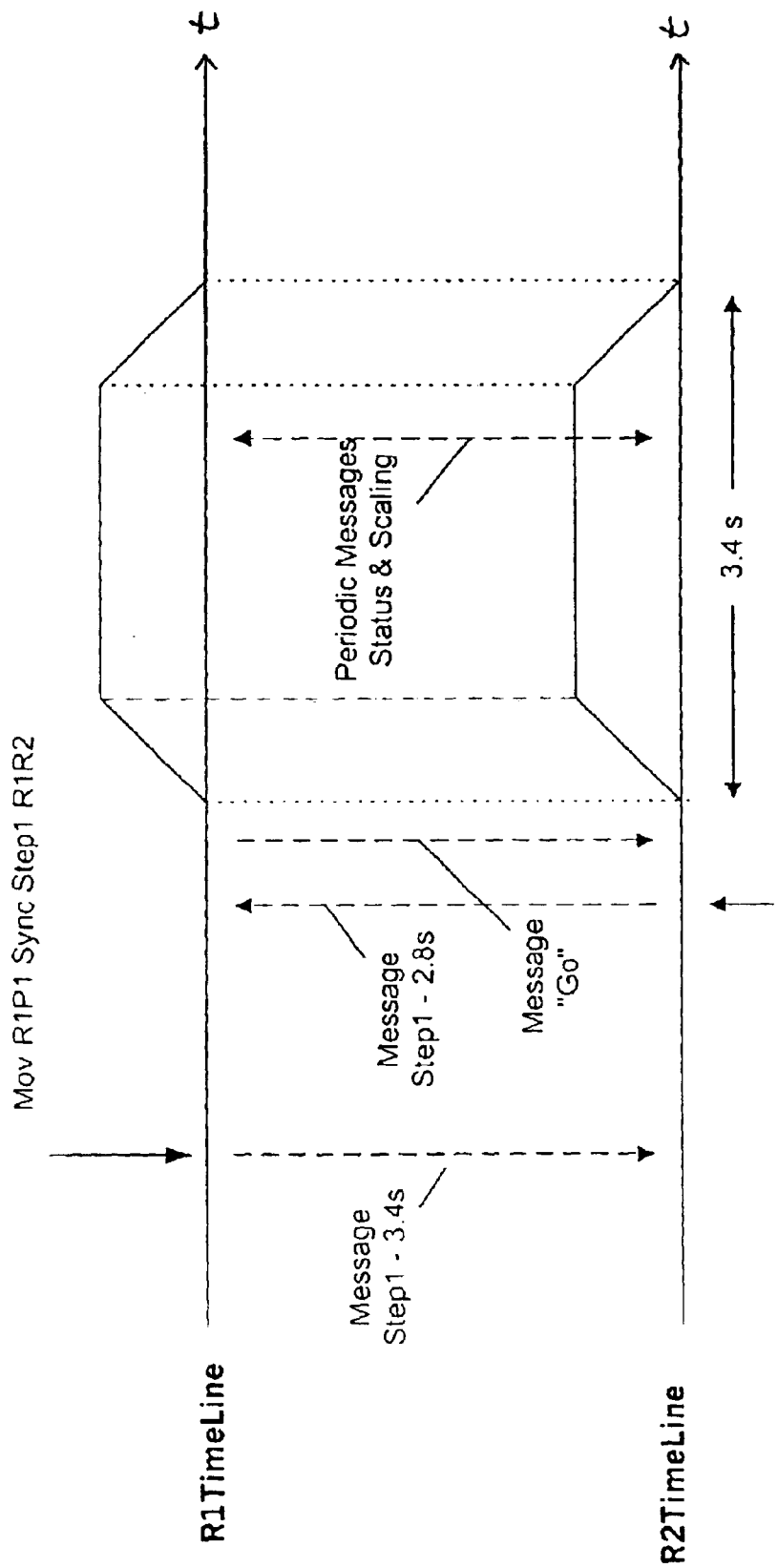
FIGS. 9a, 9b show messages and timing for typical synchronized motions under various scenarios.
Figure 9B:
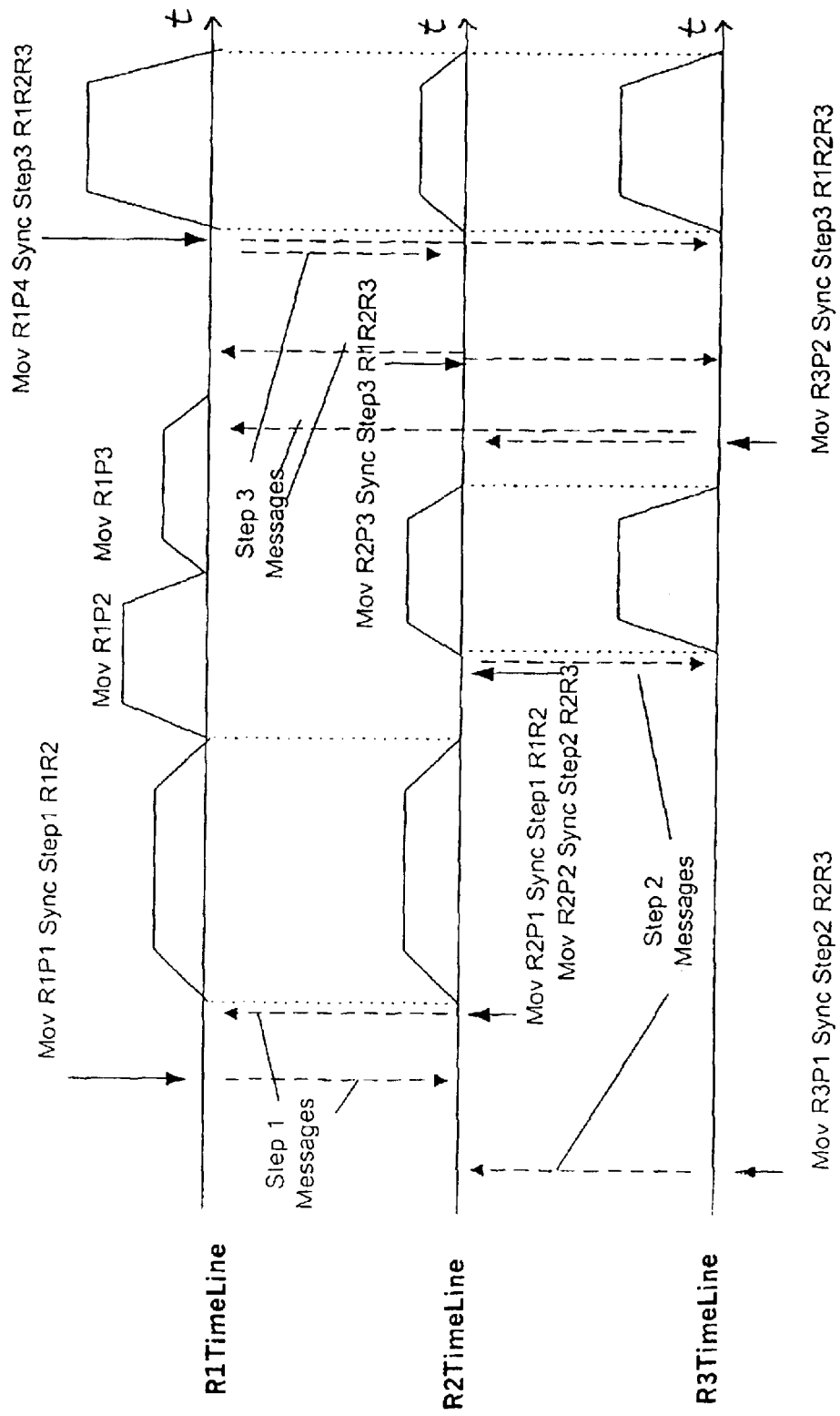

FIGS. 9a, 9b show timing diagrams for two different sets of time synchronized motions, a simple one and a complex one.

The simple synchronized motion in FIG. 9a involves two robots R1, R2 each executing one time synchronized motion. Robot R1 is to move to a position R1P1 at the same time robot R2 moves to a position R2P1 (positions not shown in the diagram). The two control programs are arranged to recognize that they are to synchronize with each other for the motion with a same label, e.g. "Step1". They also each know that they are to synchronize with the other because of the sync list, "R1R2" (R1 knows its partner is R2, R2 knows its partner is R1). The corresponding statements of the program code are given above and below the timelines t, respectively.

The example in FIG. 9a assumes that R1's control program arrives at its motion statement first, and its Planner issues a message to R2 saying that it is at label "Step1" and it will need 3.4 s to execute its motion. R1's Planner then waits for a message from R2.

Later, R2 arrives at its motion statement. Its Planner issues a message to R1 saying that it is at label "Step1" and it will need 2.8 s to execute its motion. R2 already has its message from R1. Its sync list is satisfied, and it knows the motion of R1 will take the longest of the two times, i.e. 3.4 s (vs. 2.8 s for R2). Its Planner finishes and issues a scaled motion planning with a duration of 3.4 s to its Interpolator. Scaled motion planing means that the speed of each robot is scaled slightly downward from its programmed value to maintain time coordination with the other robots. The robot taking the longest to execute its motion will dictate the scaling for all other robots. The Interpolator then waits for a "Go" signal from R1. (The robot taking the longest time issues the "Go"-signal.)

When R1's Planner receives the message from R2, its sync list is then satisfied and it issues a motion to its Interpolator for 3.4 s. R1's Interpolator sends "Go" to R2, and they both begin interpolation.

When clock synchronization is used, the "Go" signal is given at the beginning of both robots' interpolation cycles, and they both interpolate in lock step (with no need for communication other than clock synchronization). The registration between robots is extremely precise, as precise as the clock synchronization itself.

A much more complex series of synchronized motions is illustrated in FIG. 9b. It shows nine motions issued by control programs on three different robots R1–R3. Robot R1 issues four motions, two of which are synchronized with other robots. Robot R2 issues three motions, all of which are synchronized with other robots, and robot R3 issues two motions, both synchronized with other robots.

The three synchronization labels are "Step1", "Step2" and "Step3". Robots R1 and R2 participate together at Step1. Robots R2 and R3 participate together at Step2. Robots R1, R2 and R3 participate together at Step3.

What is claimed is:

1. A method for controlling a system of a plurality of robots, said system comprising:

a plurality of controllers, each having an associated motion system controlling attached robots and receiving motion instructions from at least one motion instruction source, and a computer network over which said controllers communicate;

wherein time coordinated motion instructions are define and executed by said control program, each such time coordinated motion instruction with unique label, such that information is communicated among said plurality of controllers; and wherein robot motion produced by like labeled time coordinated motion instructions executed on any of said plurality of controllers executes in such a way that they jointly begin at a first time, follow a common relative velocity profile, and jointly end at a second time.

2. The method according to claim 1, wherein an associated clock in each controller produces timing information based on a temporal reference frame;

wherein a system for supplying a synchronizing signal to said controllers periodically aligns the temporal reference frames of said clocks; and wherein said controllers use said clocks to control said associated motion systems such that said attached robots controlled by said motion systems operate with clock-alignment.

3. The method according to claim 2, wherein a signal with a first frequency and phase is used to adjust a phase of one of said clocks operating at a second higher frequency on each of the plurality of controllers to make the phases of said higher frequency clocks the same in all of said plurality of controllers; and wherein said first frequency signal is proportional to the out-of-phase-ness.

4. A method for controlling a system of a plurality of robots, said system further comprising:

a plurality of controllers, each having an associated motion system controlling attached robots;

at least one of said controllers having at least one motion instruction source; and a computer network over which said controllers communicate;

wherein at least one first controller of said plurality of controllers sends a commanded position of its a attached robot over said network;

wherein at least one second controller of said plurality of controllers receives said commanded position over said network from said first controller;

wherein said second controller defines at least one first robot reference frame with a fixed position relative to some point on said attached robot of said first controller (independent reference frame) and at least one second robot reference frame with a fixed position relative to some point on said attached robot of said so controller;

wherein said second controller by using said commanded position maintains a spatial transformation relationship (dependency relationship) between said second robot reference frame (dependent reference frame) and said independent reference frame by moving its an attached robot to maintain said transformation relationship; and wherein said dependency relationship is defined by a motion instruction source of said second controller.

5. The method according to claim 4, wherein said spatial transformation relationship is a Cartesian transformation relationship.

6. The method according to claim 4, wherein a teaching system of said second controller, using said commanded position, records a taught position defined relative to said independent reference frame for later use, such that upon later use said second controller causes said second robot reference frame to follow a path prescribed by a motion instruction source of said second controller to said taught position.

7. The method according to claim 4, wherein said dependency is created by a motion of said second robot reference frame to a position defined relative to said independent reference frame from a position defined relative to a reference frame different from said independent reference frame.

8. The method according to claim 4, wherein said second controller maintains said transformation dependency relationship between said dependent reference frame and said independent reference frame while there is no command from any of said motion instruction sources of said second controller and/or when said second controller is changing from one of said motion instruction sources to another.

9. The method according to claim 4, wherein said dependent reference frame defined with respect to a robot attached to a first controller is defined as an independent reference frame with respect to said robot by a different controller.

10. A method for controlling a system of a plurality of robots, said system farther comprising:
    a plurality of controllers, each having an associated moon system controlling attached robots;
    at least one of said controllers having at least one motion instruction source; and
    a computer network over which said controllers communicate;
    wherein at least one first controller of said plurality of controllers sends a commanded position of its A attached robot over said network;
    wherein at least one second controller of said plurality of controllers receives said commanded position over said network from said first controller;
    wherein said second controller defines at least one first robot reference frame with a fixed position relative to some point on said attached robot of said first controller (independent reference frame) and at least one second robot reference frame with a fixed position relative to some point on said attached robot of said second controller;
    wherein said second controller by using said commanded position maintains a spatial transformation relationship (dependency relationship) between said second robot reference frame (dependent reference frame) and said independent reference frame by moving an attached robot to maintain said transformation relationship;
    wherein said dependency relationship is defined by a motion instruction source of said second controller;
    wherein further an associated clock in each controller produces timing information based on a temporal reference frame;
    wherein a system for supplying a synchronizing signal to said controllers periodically aligns said temporal reference frames of said clocks; and wherein said controllers use said clocks to control said associated motion systems such that said attached robots controlled by said motion systems operate with clock-alignment.

11. The method according to claim 10, wherein a teaching system of said second controller, using said commanded position, records a taught position defined relative to said independent reference frame for later use, such that upon later use said second controller causes said second robot reference frame to follow a path prescribed by a motion instruction source of said second controller to said taught position.

12. The method according to claim 10, wherein said dependency is created by a motion of said second robot reference frame to a position defined relative to said independent reference frame from a position defined relative to a reference frame different from said independent reference frame.

13. The method according to claim 10, wherein said second controller maintains said fixed transformation dependency relationship between said dependent reference frame and said independent reference frame while there is no command from any of said motion instruction sources of said second controller and/or when said second controller is changing from one of said motion instruction sources to another.

14. The method according to claim 10, wherein said dependent reference frame defined with respect to a robot attached to a first controller is defined as an independent reference frame with respect to said robot by a different controller.

15. A system for controlling a plurality of robots, said system comprising:
    a plurality of motion controllers, each of said plurality of motion controllers having an associated motion system controlling an attached robot, with each of said motion controllers receiving motion instructions from at least one motion instruction source; and
    a computer network over which said controllers communicate;
    wherein said control program is arranged for defining and executing a uniquely labeled time coordinated motion instruction for communicating information among said plurality of controllers;.and
    wherein said controllers are arranged for synchronized execution of like labeled time coordinated motion instructions such that said instructions execute in such a way that they jointly begin at a first time, follow a common relative velocity profile, and jointly end at a second time.

16. The system according to claim 15, wherein said motion instruction source is local to said controller.

17. The system according to claim 15, wherein said motion instruction source is remote from said controller.

18. The system according to claim 15 further comprising:
    an associated clock for each controller that produce timing information based on a temporal reference frame; and
    a system for supplying a synchronization signal to said controllers that periodically aligns the temporal reference frames of said clocks;
    said controllers being arranged for using said clocks to control said associated motion systems such that said attached robots controlled by said motion systems operate with clock-alignment.

19. The system according to claim 18, wherein said clocks are hardwired to said controllers.

20. The system according to claim 18, wherein said clocks are connected to said controllers via phase locking means, said phase locking means comprising a serial synchronizing connection and/or an Ethernet connection.

21. A system for controlling a plurality of robots, said system comprising:
 a plurality of controllers, each having an associated motion system attached robots;
 at least one of said controllers, having at least one motion instruction source;
 a computer network over which said controllers communicate;
 at least one first controller of said plurality of controllers having a position sending system for sending a commanded position of said attached robots over said network;
 at least one second controller of said plurality of controllers having a position receiving system for receiving said commanded position over said network from at least one of said first controllers;
 said second controller arranged for defining at least one first robot reference frame with a fixed position relative to some point on said robot attached to said first controller (independent reference frame) and at least one second robot reference frame with a fixed position relative to some point on said robots attached to said second controller;
 said second controller arranged for maintaining a certain spatial transformation relationship (dependency relationship) between said second robot reference frame (dependent reference frame) and said independent reference frame;
 said relationship specified by sad motion instruction source of said second controller.

22. The system according to claim 21, wherein said spatial relationship is a Cartesian transformation relationship.

23. The system according to claim 21, wherein a teaching system of said second controller is arranged for recording taught positions defined relative to an independent reference frame for later.

24. The system according to claim 21, wherein said notion instruction source of said second controller is arranged for creating said dependency relationship between a second robot reference frame and said independent reference frame.

25. The system according to claim 21, wherein said motion instruction source of said second controller is arranged for issuing a relative motion instruction such that said dependency relationship of said second controller is a motion of said dependent reference frame defined relative to said independent reference frame.

26. The system according to claim 21, wherein said second controller is arranged for maintaining said transformation dependency relationship between said dependent reference frame and said independent reference fire while there is no command from any one of said motion instruction sources of said second controller and/or when said second controller changes from one of said instruction sources to another.

27. A system for controlling a plurality of robots, said system comprising:
 plurality of controllers, each having an associated motion system controlling attached robots;
 at least one of said controllers having at least one motion instruction source;
 a computer network over which said controllers communicate;
 at least one first controller of said plurality of controllers having a position sending system for sending a commanded position of said attached robot over said network;
 at least one second controller of said plurality of controllers having a position receiving system for receiving said commanded position over said network from at least one of said first controllers;
 said second controller arranged for defining at least one first robot reference frame with a fixed position relative to some point on said robot attached to said first controller (independent reference frame) and at least one second robot reference frame with a fixed position relative to some point on said robot attached to said second controller,
 said second controller arranged for maintaining a certain spatial transformation relationship (dependency relationship) between said second robot reference frame (dependent reference frame) and said independent reference frame,
 said relationship specified by said motion instruction source of said second controller; said system further comprising;
 an associated clock or each controller that produces timing information based on a temporal reference frame; and
 a system for supplying a synchronization signal to said controllers that periodically aligns the temporal reference frames of said clocks;
 said controllers being arranged for using said clocks to control said associated motion systems such that said attached robots controlled by said notion systems operate with clock-alignment.

28. The system according to claim 27, wherein a teaching system of said second controller is arranged for recording taught positions defined relative to an independent reference fine for later use.

29. The system according to claim 27, wherein said motion instruction source of said second controller is arranged for creating said dependency relationship between a second robot reference frame and said independent reference free.

30. The system according to claim 27, wherein said motion instruction source of said second controller is arranged for issuing a relative motion instruction such that said dependency relationship of said second controller is a motion of said dependent reference frame defined relative to said independent reference frame.

31. The system according to claim 27, wherein said second controller is arranged for maintaining said transformation dependency relationship between said dependent reference frame and said independent reference frame while there is no command from any one of said motion instruction sources of said second controller and/or when said second controller changes from one of said instruction sources to another.

32. The method according to claim 4, wherein the spatial transformation relationship (dependency relationship) of the at least one second controller is a motion of a second robot reference frame defined relative to an independent reference frame, said relative motion instruction issued by a motion instruction source of said at least one second controller.

* * * * *